United States Patent
Sullivan et al.

(10) Patent No.: US 10,448,108 B2
(45) Date of Patent: Oct. 15, 2019

(54) METHODS AND APPARATUS TO MODEL ON/OFF STATES OF MEDIA PRESENTATION DEVICES BASED ON RETURN PATH DATA

(71) Applicant: The Nielsen Company (US), LLC, New York, NY (US)

(72) Inventors: Jonathan Sullivan, Hurricane, UT (US); Katya Sotiris, Columbia, MD (US); Neung Soo Ha, Bethesda, MD (US); Balachander Shankar, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/639,164

(22) Filed: Jun. 30, 2017

(65) Prior Publication Data

US 2018/0152762 A1    May 31, 2018

Related U.S. Application Data

(60) Provisional application No. 62/428,487, filed on Nov. 30, 2016.

(51) Int. Cl.
*H04N 21/466* (2011.01)
*H04H 60/31* (2008.01)
(Continued)

(52) U.S. Cl.
CPC ..... *H04N 21/4667* (2013.01); *G06Q 30/0204* (2013.01); *H04H 60/31* (2013.01);
(Continued)

(58) Field of Classification Search
None
See application file for complete search history.

(56) References Cited

U.S. PATENT DOCUMENTS

| 5,974,299 A | 10/1999 | Massetti |
| 7,730,509 B2 | 6/2010 | Boulet et al. |

(Continued)

OTHER PUBLICATIONS

Doe et al. "Method for Integrating and Calibrating Multiple Sources of Data to Create an Audience Research Database: LPM/PPM/STB Integration—Methodology Overview." Expired U.S. Appl. No. 62/104,297, filed Jan. 16, 2015, 8 pages.

*Primary Examiner* — Omar S Parra
(74) *Attorney, Agent, or Firm* — Hanley, Flight & Zimmerman, LLC

(57) ABSTRACT

Methods and apparatus to model on/off states of media presentation devices based on return path data are disclosed. An example method includes generating a modelled tuning segment distribution indicative of modelled durations of modelled tuning segments. The modelled tuning segments is based on panel tuning segments during which panelists were exposed to first media. The example method further includes obtaining return path data (RPD) tuning information reported from an RPD device. The RPD tuning information is indicative of a reported RPD tuning segment during which the RPD device was accessing second media. The example method also includes estimating a set-on time for a media set associated with the RPD device based on the RPD tuning information and the modelled tuning segment distribution. The set-on time is indicative of a period of time when the media set is powered on.

24 Claims, 12 Drawing Sheets

(51) Int. Cl.

| | | |
|---|---|---|
| *H04H 60/32* | (2008.01) | |
| *H04N 21/24* | (2011.01) | |
| *G06Q 30/02* | (2012.01) | |
| *H04N 21/25* | (2011.01) | |
| *H04N 21/258* | (2011.01) | |
| *H04H 60/66* | (2008.01) | |

(52) U.S. Cl.
CPC ........ *H04H 60/32* (2013.01); *H04N 21/2407* (2013.01); *H04N 21/252* (2013.01); *H04N 21/25866* (2013.01); *H04H 60/66* (2013.01)

(56) References Cited

U.S. PATENT DOCUMENTS

| | | |
|---|---|---|
| 7,954,120 B2 * | 5/2011 | Roberts .................. H04H 60/32 |
| | | 725/12 |
| 8,701,134 B2 | 4/2014 | Whinmill et al. |
| 8,904,419 B2 | 12/2014 | Vinson et al. |
| 8,938,748 B1 | 1/2015 | Mirisola et al. |
| 9,009,749 B2 | 4/2015 | Harsh et al. |
| 9,204,188 B1 | 12/2015 | Mirisola et al. |
| 9,204,189 B1 | 12/2015 | Oztaskent et al. |
| 9,420,320 B2 | 8/2016 | Doe |
| 9,473,795 B2 | 10/2016 | Stokes et al. |
| 9,578,361 B2 | 2/2017 | Doe |
| 2012/0110027 A1 | 5/2012 | Falcon |
| 2014/0379421 A1 * | 12/2014 | Shankar ............ G06Q 30/0204 |
| | | 705/7.29 |
| 2016/0066005 A1 | 3/2016 | Davis et al. |

\* cited by examiner

METHODS AND APPARATUS TO MODEL ON/OFF STATES OF MEDIA PRESENTATION DEVICES BASED ON RETURN PATH DATA

RELATED APPLICATION

This patent claims the benefit of U.S. Provisional Patent Application Ser. No. 62/428,487, which was filed on Nov. 30, 2016. U.S. Provisional Patent Application Ser. No. 62/428,487 is hereby incorporated herein by reference in its entirety.

FIELD OF THE DISCLOSURE

This disclosure relates generally to audience measurement and, more particularly, to methods and apparatus to model on/off states of media presentation devices based on return path data.

BACKGROUND

Many people access media through set top boxes (STBs) or other media presentation devices provided by media content providers (e.g., cable media providers, satellite media providers, etc.). Some STBs are equipped to report tuning information indicative of the media accessed by the STBs back to the content providers. Tuning information reported back to content providers via STBs or other similar devices is sometimes referred to as return path data (RPD). RPD tuning information may be used by audience measurement entities to track or monitor people's exposure to media.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
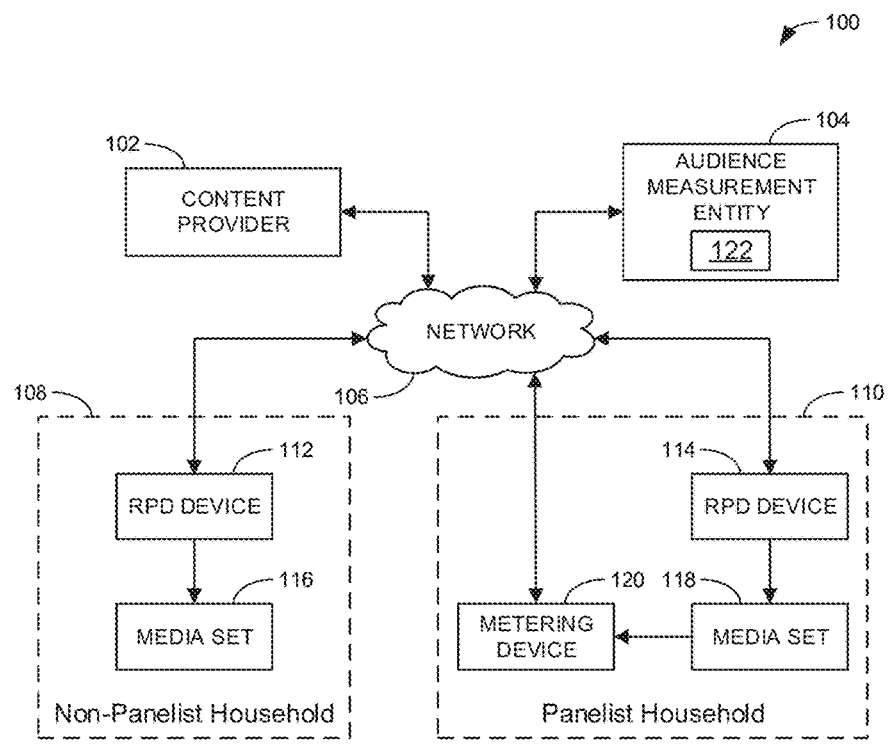
FIG. 1 is an example environment in which the teachings disclosed herein may be implemented.

As used herein, an RPD device refers to any type of device (e.g., a STB or other similar device) that is capable of accessing media from a content provider and reporting tuning information regarding the media accessed back to the content provider. Such tuning information is referred to herein as RPD tuning information or simply RPD. RPD devices are often standalone devices that connect to separate media presentation devices, such as, television sets, radios, smartphones, tablets, computers, or any other device capable of playing the media accessed by the RPD device. Media presentation devices that play media accessed by associated RPD devices are referred to herein as media sets or simply sets for purposes of brevity.

In some instances, a media set and an RPD device may be integrated into a single device. However, when a media set and an associated RPD device are separate devices, it is possible for one to be powered on while the other is turned off. As a result, while RPD tuning information reported by an RPD device provides data indicative of media accessed by the RPD device, such data is not necessarily indicative of media being played for consumption on the associated media set where the RPD device is located. For example, after people watch a show on their television set (e.g., a media set) accessed via a connected STB (e.g., an RPD device), they may turn off their television set without turning off the associated STB. In such a situation, the STB will continue to access media provided on the station to which the STB was last tuned and continue to report such as RPD tuning information despite the fact that no media is being played in the household because the television set is turned off. Therefore, RPD tuning information may be unreliable to determine the media to which people are exposed unless the on/off state of the associated media set can be determined.

Examples disclosed herein calculate capped durations for RPD tuning segments reported from an RPD device that are estimated to correspond to periods of time when an associated media set is turned on. As used herein, an RPD tuning segment refers to a period of time during which an RPD device is accessing media from a particular source of media (e.g., is tuned to a particular station or channel). Thus, each time a station or channel is changed on the RPD device corresponds to the ending of one RPD tuning segment and the beginning of a second different RPD tuning segment. RPD tuning segments may also end if the RPD device is powered off or enters a standby mode. Likewise, an RPD tuning segment begins whenever the RPD device is powered on or otherwise is removed from standby mode. The capped durations estimated in the disclosed examples will typically be at the front-end of an RPD tuning segment with unretained portions of the tuning segment extending thereafter because people are known to turn off their media sets while leaving associated RPD devices powered on. However, it may be possible that a capped duration corresponds to the tail-end of an RPD tuning segment when people turn on their media sets to begin playing media to which an RPD device that was left powered on was already accessing. Accordingly, examples disclosed herein calculated both front-end and tail-end capped durations for RPD tuning segments that may be used to estimate the period(s) of time when an associated media set is powered on and actually playing the media accessed by the RPD device.

The period(s) of time when a media set is on, as calculated from front-end and tail-end capped durations estimated from RPD tuning information collected from an associated RPD device, solves a problem that arises from the current state of technology in which associated media sets and RPD devices may be independently turned off or powered on. This state of technology gives rise to the situation where an RPD device is accessing media and transmitting associated RPD tuning information despite the fact that the media is not being played on an associated media set. As a result, audience measurements based on RPD tuning information are unreliable because it may not represent the media to which people were actually exposed. Examples disclosed herein resolve this problem by modelling RPD tuning segments to accurately predict when media sets are turned on and, thus, playing the media accessed by the associated RPD devices. This improves audience measurement metrics because it enables the use of RPD tuning information as a reliable source of audience exposure to media thereby significantly expanding the population from which audience measurement data is available beyond the relatively limited population pools of audience measurement panelists.

FIG. 1 is an example environment 100 in which the teachings disclosed herein may be implemented. In the illustrated example, a content provider 102 provides media to content subscribers and collects RPD tuning information indicative of the subscribers accessing the media. The content provider 102 may provide the RPD tuning information to an audience measurement entity (AME) 104 (e.g., the Nielsen Company (US) LLC) to enable to the AME 104 to generate audience measurement metrics. In some examples, the content provider 102 and the AME 104 communicate via a network 106 such as, for example, the Internet.

As shown in FIG. 1, the example environment 100 includes a non-panelist household 108 and a panelist household 110. Some of the subscribers to the services of the content provider 102 may be people that have agreed to participate as panelists in a research study administered by the AME 104. Thus, the panelist household 110 of FIG. 1 represents a household that includes one or more individuals that have subscribed to the content provider 102 and that have enrolled as a panelist with the AME 104. In some examples, panelists correspond to a statistically selected subset of all potential audience members that is representative of a whole population of interest. In some such panel-based monitoring systems, the panelists agree to provide detailed demographic information about themselves. In this manner, detailed exposure metrics are generated based on collected media exposure data and associated user demographics, which can then be statistically extrapolated to an entire population of interest (e.g., a local market, a national market, a demographic segment, etc.).

Both the non-panelist household 108 and the panelist household 110 include an RPD device 112, 114. The RPD devices 112, 114 may be provided by the content provider 102 to enable access to media generated by content provider 102. Further, the RPD devices 112, 114 are capable of reporting RPD tuning information back to the content provider 102 indicative of the media being accessed by the RPD devices 112, 114. In some examples, the RPD devices 112, 114 access media from the content provider 102 and report RPD tuning information to the content provider 102 via the network 106. Each of the RPD devices 112, 114 is connected to a corresponding media set 116, 118 to play the media accessed by the RPD devices 112, 114. In the illustrated example, the RPD devices 112, 114 are separate from the corresponding media sets 116, 118 such that the media sets 116, 118 may be powered off while the RPD devices 112, 114 remain powered on. As a result, RPD tuning information reported by the RPD devices 112, 114 may not be representative of media that is actual played on the corresponding media sets 116, 118.

The panelist household 110 is provided with a metering device 120 to track and/or monitor the media played on the media set 118 and report such to the AME 104 (e.g., via the network 106). In some examples, the metering device 120 also tracks and reports who is being exposed to the media being played so that the media exposure can be associated with particular individuals and their associated demographics previously collected when the household members enrolled as panelists. While the duration of media tuning segments actually played on the media sets 116, 118 cannot be directly confirmed from reported RPD tuning information because such information does not indicate whether the media sets 116, 118 are on or off, the audience measurement data reported by the metering device 120 does indicate the on/off state of the media set 118. As a result, the AME 104 is able to know the actual duration of media tuning segments played on the media set 118 of the panelist household 110. However, there is no direct way for the AME 104 to know the actual duration of media tuning segments played on the media set 116 of the non-panelist household 108.

In some examples, the AME 104 includes an audience measurement module 122 to predict the on/off state of the media set 116 of the non-panelist household 108 as described more fully below. Briefly, the audience measurement module 122 uses the actual duration of media tuning segments played in panelist households (e.g., the panelist household 110), as reported from metering devices (e.g., the metering device 120) monitoring such, to generate a model of RPD tuning segments that would be expected if media being accessed was reported by RPD devices (e.g., the RPD devices 112, 114). Based on the resulting modelled tuning segments and a knowledge of the actual durations of tuning segments played on media devices in panelist households, the example audience measurement module 122 may estimate capped durations for the RPD tuning segments reported from RPD devices 112 in non-panelist households that correspond to when associated media sets 116 in such households are likely to be powered on. Based on these capped durations of RPD tuning segments, reliable audience measurement metrics may be generated for non-panelist households.

Figure 2:
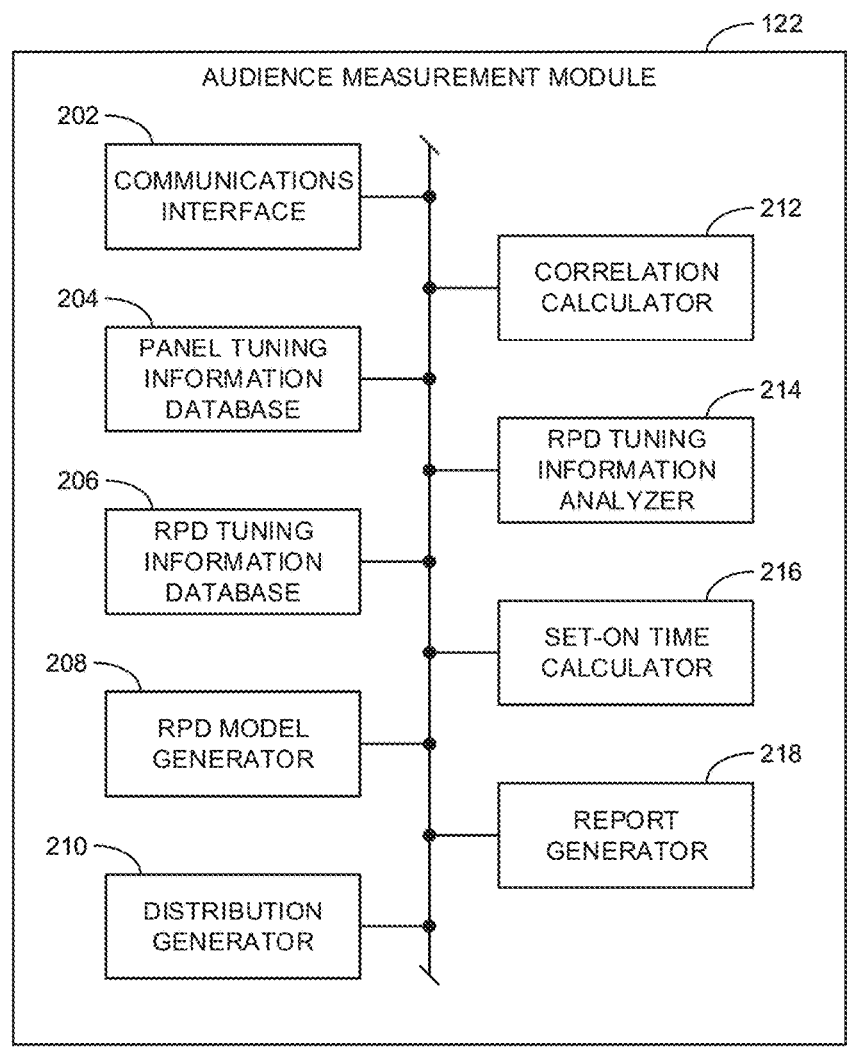
FIG. 2 is an example implementation of the example audience measurement module of FIG. 1.

FIG. 2 is an example implementation of the example audience measurement module 122 of FIG. 1. The example audience measurement module 122 includes an example communications interface 202, an example panel tuning information database 204, an example RPD tuning information database 206, an example RPD model generator 208, an example distribution generator 210, an example correlation calculator 212, an example RPD tuning information analyzer 214, an example set-on time calculator 216, and an example report generator 218.

The example audience measurement module 122 is provided with the example communications interface 202 to communicate with the metering device 120 installed in the panelist household 110. That is, the metering device 120 may report audience measurement data to the AME 104 that is received by the communications interface 202. The communications interface 202 may receive audience measurement data from other panelist households not represented in the illustrated example. The collected audience measurement data includes panel tuning information, which may be stored in the panel tuning information database 204. The panel tuning information may include an indication of the media played on the media sets 118 in the panelist household 110. In some example, the media may be uniquely identified. In other examples, the panel tuning information may identify a particular source of media (e.g., a station ID) from which the particular media may be identified. The panel tuning information may also include timestamps and/or other forms of timing information indicative of the start time and end time of particular media tuning segments played on the media sets 118 of panelists. Inasmuch as the panel tuning information is based on media actual played on the media sets of panelist homes, the panel tuning information will be limited to periods of time when the media set 118 is powered on and actually playing media. Each distinct period of time during which a media set 118 in the panelist household 110 is playing media associated with a particular source (e.g., a particular station or channel to which the RPD device 112 is tuned) is referred to herein as a panel tuning segment. A panel tuning segment is distinct from an RPD tuning segment defined above in that panel tuning segments are tied to times when the associated media set is powered on and actually playing media.

Additionally, in the illustrated example, the communications interface 202 of the audience measurement module 122 receives RPD tuning information from the content provider 102. The content provider 102 collects the RPD tuning information reported from RPD devices (e.g., the RPD devices 112, 114) accessing media content provided by the content provider 102. In some examples, the communications interface 202 may receive the RPD tuning information directly from the RPD devices 112, 114 independent of communications between the AME 104 and the content provider 102. The RPD tuning information may be stored in the RPD tuning information database 206. Similar to the panel tuning information, the RPD tuning information includes a media identifier (e.g., a unique identifier, a station ID, etc.) to identify the media accessed by the RPD devices. Further, the RPD tuning information includes timing information indicative of a start time and end time of RPD tuning segments. Inasmuch as the RPD devices 112, 114 may be separately powered from the associated media sets 116, 118, it is possible that some portions of the collected RPD tuning segments correspond to media that was never actually played on a media set 116, 118 (e.g., when the RPD tuning device 112, 114 is on and reporting tuning information while the corresponding media set 116, 118 is turned off).

Figure 3:
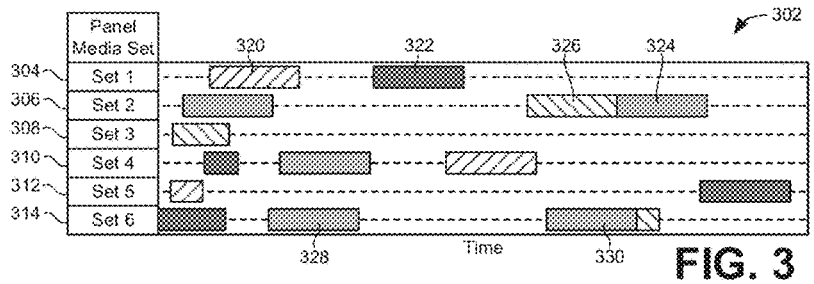
FIG. 3 is a schematic representation of panel tuning information corresponding to media played on multiple different media sets over a period of time.

The example audience measurement module 122 is provided with the example RPD model generator 208 to generate a model of RPD tuning information based on predicted extensions of the durations of panel tuning segments reported in the collected panel tuning information. For example, FIG. 3 is a schematic representation of panel tuning information 302 corresponding to media played on multiple media sets 304, 306, 308, 310, 312, 314 over a period of time. In the illustrated example, the media played on each media set 304, 306, 308, 310, 312, 314 is provided to the media set via an associated RPD device. In some examples, each media set 304, 306, 308, 310, 312, 314 is associated with a different panelist household. In other examples, a single panelist household may include more than one of the media sets 304, 306, 308, 310, 312, 314. In any event, the panel tuning information 302 represented in FIG. 3 is based on data collected from associated metering devices 120 in the panelist household(s) 110 and independent of RPD tuning information reported by the associated RPD devices 114. That is, the panel tuning information 302 represents the actual duration and timing of media played on each respective media set 304, 306, 308, 310, 312, 314 as reported by an associated metering device 120.

Individual panel tuning segments of media played on each media set 304, 306, 308, 310, 312, 314 are represented in FIG. 3 by individual boxes with the dashed lines indicative of when the corresponding media set was powered off or otherwise not playing media. The different shading and/or cross-hatching within the boxes represent different media sources (e.g., stations, channels, etc.) to which the associated RPD devices 114 are tuned to provide the media. Thus, during the represented period, the first media set 304 is associated with two panel tuning segments 320, 322 separated by a gap in time indicating the first media set 304 was turned off between the two tuning segments 320, 322. Separate panel tuning segments are not necessarily spaced in time. For example, the second media set 306 includes two panel tuning segments 324, 326 in which the second panel tuning segment 326 immediately follows the first panel tuning segment 324 indicating the audience member changed the channel or station to which the RPD device 114 was tuned.

Figure 4:
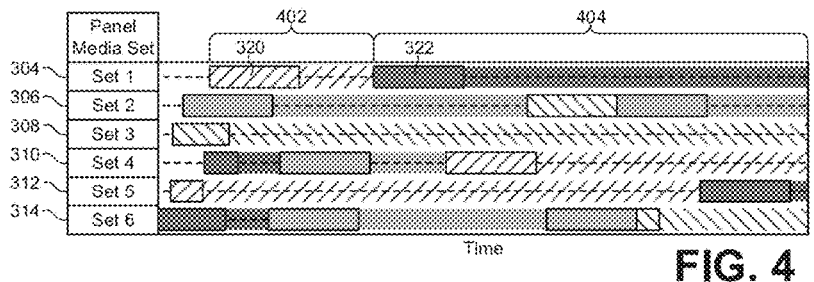
FIGS. 4-6 illustrate how RPD tuning information may be modelled based on the panel tuning information of FIG. 3.

As mentioned above, the example RPD model generator 208 may use the panel tuning information 302 to model expected RPD tuning information by modelling durations for the panel tuning segments reported in the collected panel tuning information that are extended beyond the actual duration of the panel tuning segments. It may initially be assumed that RPD devices 114 are always powered on. In such situations, an RPD device would continually report RPD tuning information such that the reported RPD tuning segments would always appear to be contiguous with each tuning segment ending when a new tuning segment begins. This situation is represented in FIG. 4 in which the shading and cross-hatching of the actual panel tuning segments have been extended out indefinitely as modelled RPD tuning segments. Thus, the first panel tuning segment 320 played on the first media set 304 is assumed to extend to the beginning of the second panel tuning segment 322 to model a first tuning segment 402 associated with the first media set 304. A second modelled tuning segment 404 corresponds to the second panel tuning segment 322 of FIG. 3 but has been extended to the end of the period of time represented in the figure.

In actual implementation, most RPD devices 114 do not remain on indefinitely as represented in FIG. 4. Rather, many RPD devices 114 include a standby timer that will cause the RPD devices 114 to stop reporting RPD tuning information if there has been no activity for a set amount of time. The particular length of a standby timer will likely be different for different RPD devices 114 and/or different content providers 102. In some examples, the content provider 102 may provide the AME 104 with the standby timer length for the RPD devices 114 associated with the content provider 102. In other examples, the standby timer length may be determined from an analysis of RPD tuning information aggregated from multiple RPD devices 114 of the same type (and/or associated with the same content provider 102). More particularly, the AME 104 may determine the standby timer by identifying peaks in a distribution of durations of reported RPD tuning segments.

Figure 5:
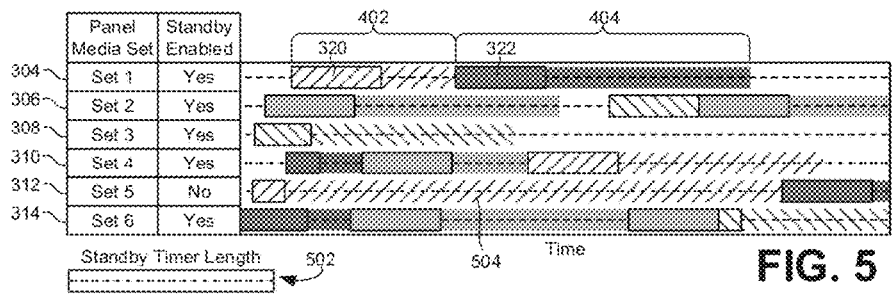

FIG. 5 illustrates how the example RPD model generator 208 may reduce the indefinite-duration modelled tuning segments of FIG. 4 based on an example standby timer length 502. The second RPD tuning segment 404 of the first media device 304, as represented in FIG. 5, is shorter than initially assumed in FIG. 4 because, under the model, the tuning information is expected to stop after the standby timer length has elapsed following the end of the panel tuning segment 322. By contrast, shortening the modelled tuning segments by the standby timer length 502 does not affect the modelled duration of the first modelled tuning segment 402 of the first media device 304 because the time gap between the first panel tuning segment 320 and the second panel tuning segment 322 is less than the standby timer length 502.

Typically, a standby timer is enabled by default in an RPD device 114. However, some users may manually disable the standby timer. Accordingly, in some examples, the RPD model generator 208 randomly selects a proportion of media sets 304, 306, 308, 310, 312, 314 as being associated with RPD devices 114 for which the standby timer is disabled. The RPD model generator 208 will not shorten the modelled tuning segments for such media sets but will leave them to extend forward in time indefinitely (or until a subsequent panel tuning segment occurs). This is represented in FIG. 5 in connection with the fifth media set 312 in which a modelled tuning segment 504 is modelled with a duration extending far beyond the standby timer length 502 while all other modelled tuning segments 504 have been shortened or capped. Although described as being extended indefinitely, in some examples, the RPD model generator 208 may model tuning segments associated with RPD devices 114 with disabled standby timers by extending the panel tuning segments for a finite but substantial extension period (e.g., 12 hours, 24 hours, 48 hours, etc.).

In some examples, the number or proportion of media sets identified to be associated with RPD devices 114 that have disabled the standby timer is derived from an analysis of aggregated RPD tuning information in a similar manner to the derivation of the standby timer length by identifying outliers on a distribution of durations of RPD tuning segments. Thus, for example, if it is determined that 85% of all RPD devices have a standby timer that is enabled, the RPD model generator 208 may select the panel tuning segments associated with 15% of the media sets 304, 306, 308, 310, 312, 314 to be modelled as being associated with an RPD device that does not have an enabled standby timer. In other examples, the RPD model generator 208 may generate a random number between 0 and 1 for each media set 304, 306, 308, 310, 312, 314 and designate the media set as either associated with a standby enabled RPD device or a standby disabled device depending on whether the number is above or below 85%.

Figure 6:
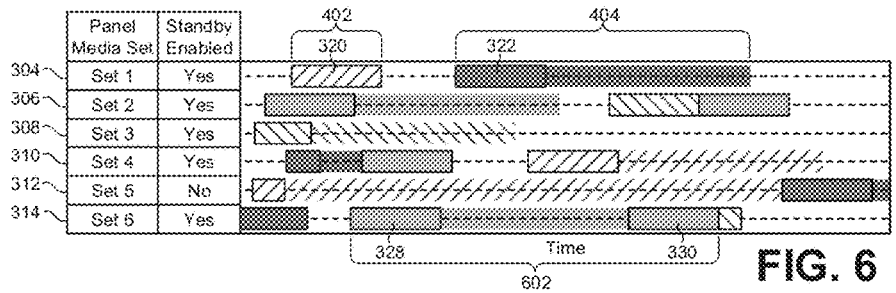

In some examples, the RPD model generator 208 also accounts for the possibility that some people will turn off their RPD devices at the same time that they turn off an associated media set. In such situations, an RPD tuning segment would not be extended beyond a corresponding panel tuning segment but limited to the same duration as the panel tuning segment. Accordingly, in some examples, the RPD model generator 208 randomly selects a proportion of the panel tuning segments as corresponding to a time when the associated RPD device 114 was turned off based on the probability that people turn off an RPD device 114. For example, assuming the probability that an RPD device 114 is powered off at the same time an associated media set is powered off is 50%, the RPD model generator may generate a random number between 0 and 1 for each panel tuning segment and then either extend the duration for a modelled tuning segment as shown in FIG. 5 or truncate the modelled duration to be coextensive with the panel tuning segment based on whether the number is above or below 50%. This is represented in FIG. 6 in which the first modelled tuning segment 402 for the first media set 304 is reduced to the same duration as the first panel tuning segment 302 of the first media set 304. By contrast, the second modelled tuning segment 404 of the first media set 304 remains with an extended modelled duration in FIG. 6 because the RPD model generator 208 randomly determined the associated RPD device 114 was not turned off at the end of the second panel tuning segment 322. Modelled tuning segments that have the same duration as the actual duration of an associated panel tuning segment (e.g., the first modelled tuning segment 402 of FIG. 6 or a modelled tuning segment associated with the panel tuning segment 326 of FIG. 3) are referred to herein as non-extended model segments.

In some instances, the RPD model generator 208 may combine or merge multiple model tuning segments associated with separate panel tuning segments into a single modelled tuning segment when the model tuning segments are contiguous and associated with a single source of media. This may occur when the separate panel tuning segments correspond to successive tuning segments accessed by an RPD device 114 that are associated with a single source of media but spaced by a gap in time corresponding to when the associated media set 118 was turned off. An example situation where this may occur is when panelists turn off their televisions after watching the evening news and then turn the television back on the next morning to catch the morning news without ever changing the channel. This scenario is represented in connection with the sixth media set 318 of FIGS. 3-6. In particular, first and second panel tuning segments 328, 330 of the sixth media set 314 are shown in FIG. 3 as being two separate tuning segments associated with the same source of media but spaced apart in time. As the RPD model generator 208 models the extended duration for the associated modelled tuning segments as outlined above, the two distinct panel tuning segments 328, 330 result in one merged modelled tuning segment 602 as represented in FIG. 6 because separate modelled tuning segments identified for each panel tuning segment 328, 330 would be contiguous (e.g., one segment ends at the same time that the next segment begins). While the combined modelled tuning segment 602 corresponds to two panel tuning segments 328, 330 in the illustrated example, the modelled tuning segment 602 could include any number of successive panel tuning segments 328, 330.

Figure 7:
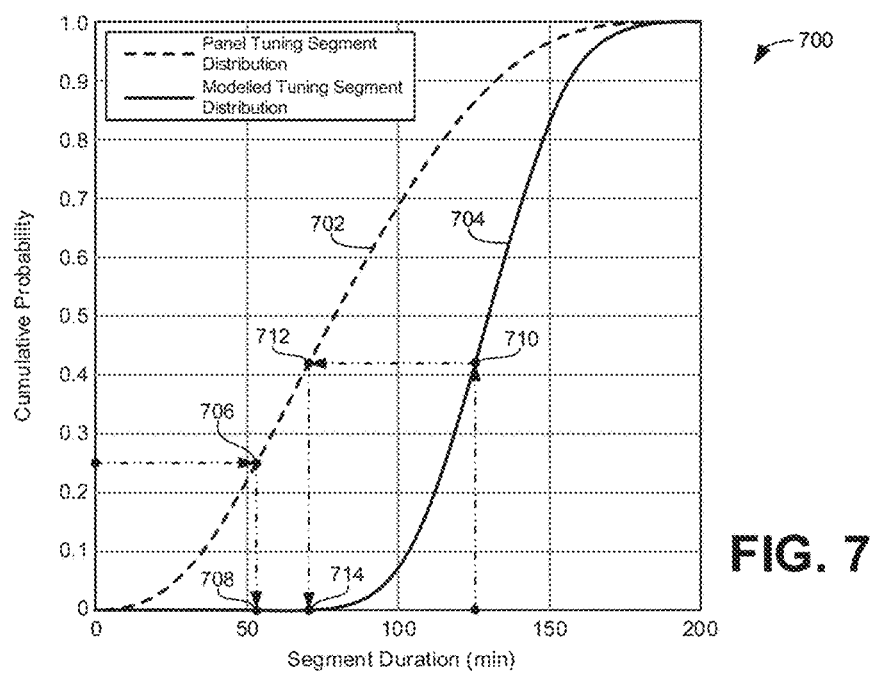
FIG. 7 illustrates example cumulative distributions of durations panel tuning segments and modelled tuning segments.

Returning to FIG. 2, the example audience measurement module 122 is provided with the example distribution generator 210 to generate a cumulative distribution of durations of the panel tuning segments reported in panel tuning information (e.g., the panel tuning information 302 represented in FIG. 3) collected from metering devices 120 in panelist households 110. Additionally, the example distribution generator 210 may generate a cumulative distribution of durations of the modelled tuning segments (e.g., as represented in FIG. 6) based on the collected panel tuning segments. In some examples, the distribution generator 210 may combine or merge the cumulative distributions of durations of both the panel tuning segments and the modelled tuning segments into a single graph 700 as shown in FIG. 7. In the illustrated example, the dashed line 702 is a panel tuning segment distribution that represents the probability distribution of the actual duration of panel tuning segments while the solid line 704 is a modelled tuning segment distribution that represents the probability distribution of the durations of the modelled tuning segments.

In some examples, the distribution generator 210 generates multiple different graphs 700 corresponding to different dimensions of interest. That is, in some examples, the panel tuning segments and corresponding modelled tuning segments are aggregated based on different characteristics or dimensions such as, for example, the daypart when the media was accessed, the day of week when the media was accessed (e.g., whether on a weekend or a weekday), the station from which the media was accessed, the genre of the media, and/or the duration of the tuning segments.

Figure 8:
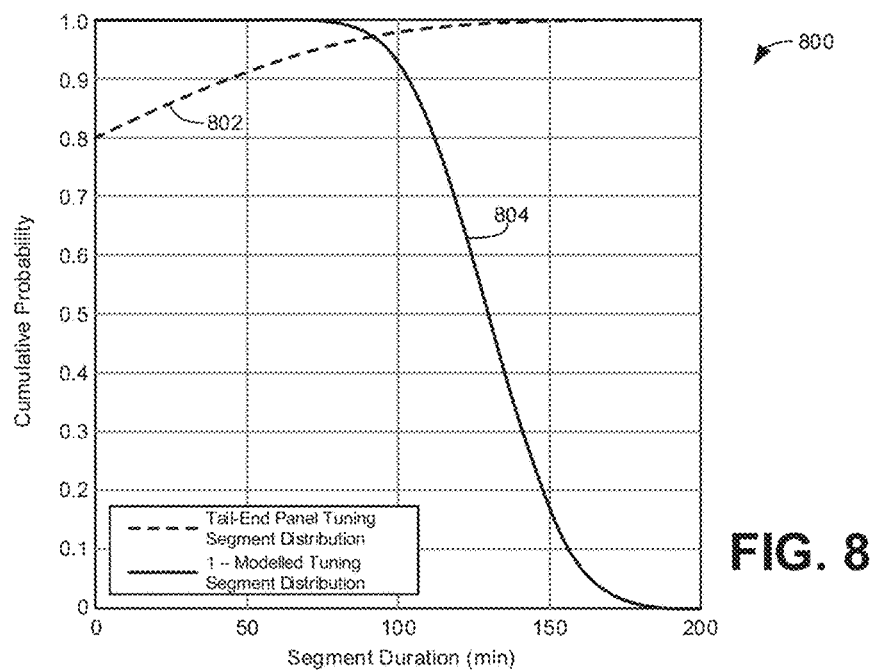
FIG. 8 illustrates example cumulative distributions of durations of tail-end panel tuning segments and associated modelled tuning segments.

In some examples, the distribution generator 210 may also generate a cumulative distribution of durations of tail-end panel tuning segments. As used herein, a tail-end panel tuning segment refers to the last panel tuning segment in a series of at least two successive panel tuning segments associated with a single modelled tuning segment that was merged from at least two modelled tuning segments. That is, with reference to FIG. 6, the second panel tuning segment 330 of the sixth media set 314 corresponds to a tail-end panel tuning segment because it is the last panel tuning segment in the modelled tuning segment 602. In some examples, the distribution generator 210 may combine or merge the cumulative distributions of durations of the tail-end panel tuning segments with 1 minus the modelled tuning segment distribution (e.g., the distribution 704 of FIG. 7) into a single graph 800 as shown in FIG. 8. In the illustrated example, the dashed line 802 is a tail-end panel tuning segment distribution that represents the probability distribution of the actual duration of tail-end panel tuning segments while the solid line 804 represents 1 minus the probability distribution 704 of the modelled tuning segments. In some examples, the distribution generator 210 generates multiple different graphs 800 corresponding to each different combination of dimensions of interest.

The example audience measurement module 122 of FIG. 2 is provided with the example correlation calculator 212 to calculate a correlation coefficient between the duration of the panel tuning segments and the duration of the corresponding modelled tuning segments. In some examples, the correlation coefficient is a Pearson correlation coefficient. In some examples, a different correlation coefficient is calculated for each combination of particular dimensions of interest for the tuning segments.

As described above, some of the modelled tuning segments are non-extended model segments because they have the same duration as the actual panel tuning segment. For example, as shown in FIG. 6, the first panel tuning segment 320 of the first media set 304 is the same duration as the corresponding non-extended model segment 402. In some examples, non-extended model segments are excluded in the calculation of the correlation coefficient.

In the illustrated example of FIG. 2, the example audience measurement module 122 is provided with the example RPD tuning information analyzer 214 to analyze RPD tuning information obtained from non-panelist households 108 to predict the actual duration of tuning segments to which individuals in the non-panelist households 108 were exposed to media. In some examples, the RPD tuning information analyzer 214 calculates capped durations for reported RPD tuning segments based on the distributions represented in FIGS. 7 and 8 that estimate the periods of time when the media sets 116 in non-panelist households 108 are turned on during the reported RPD tuning segments.

The RPD tuning information analyzer 214 may determine capped durations for reported RPD tuning segments based on either a probabilistic approach or a deterministic approach. In the probabilistic approach, the RPD tuning information analyzer 214 generates a random number between 0 and 1 and then identifies the corresponding duration from the panel tuning segment distribution 702 shown on the graph 700 of FIG. 7. As a specific example, assume that a particular reported RPD tuning segment was 125 minutes long and that the RPD tuning information analyzer 214 generated the random number of 0.25. As shown in FIG. 7, the random number of 0.25 corresponds to a particular point 706 on the panel tuning segment distribution 702. From the point 706 on the panel tuning segment distribution 702, a corresponding capped duration 708 of approximately 53 minutes may be determined from the graph 700. Thus, using the probabilistic approach, the RPD tuning information analyzer 214 determines that the reported RPD tuning segment of 125 minutes is to be shortened or capped to a probabilistic-estimated duration of 53 minutes.

In the probabilistic approach, as outlined above, the capped duration for the RPD tuning segment is based on random probabilities independent of the reported length of the RPD tuning segment. By contrast, the deterministic approach uses the reported length of the reported RPD tuning information to estimate the capped duration for the segment. In particular, assuming an initial reported RPD tuning segment of 125 minutes, a particular point 710 on the modelled tuning segment distribution 704 may be identified. As shown in the illustrated example of FIG. 7, the point 710 corresponds to a probability of approximately 0.42. The RPD tuning information analyzer 214 may use this value to identify a corresponding point 712 on the panel tuning segment distribution 702. From the point 712 on the panel tuning segment distribution 702, a corresponding capped duration 714 of approximately 71 minutes may be determined from the graph 700. Thus, using the deterministic approach, the RPD tuning information analyzer 214 determines that the reported RPD tuning segment of 125 minutes is to be shortened or capped to a deterministic-estimated duration of 71 minutes.

In some examples, the RPD tuning information analyzer 214 may estimate a final capped duration for a reported RPD tuning segment based on a weighted average of the capped durations calculated using each of the probabilistic approach and the deterministic approach described above. In some examples, the weighting of the two approaches is based on the correlation coefficient calculated by the correlation calculator 212 and the proportion or fraction of non-extended model segments, relative to all modelled tuning segments, that were excluded from the correlation analysis. More particularly, in some examples, the RPD tuning information analyzer 214 generates a random number between 0 and 1 for a particular reported RPD tuning segment. If the random number is less than or equal to the proportion or fraction of the non-extended model segments excluded from the correlation analysis as described above, the capped duration for a reported RPD tuning segment is determined to correspond to the reported duration of the reported RPD tuning segment. That is, the reported RPD tuning segment is treated as a non-extended model segment such that the duration of the tuning segment is assumed to correspond to the actual duration that media was played via a corresponding media set. For values of the random number greater than the fraction of non-extended model segments, the capped duration ($D_{cap}$) for the reported RPD tuning segment is calculated as follows:

$$D_{cap} = rD_{det} + (1-r)D_{prob} \quad \text{(Eq. 1)}$$

where r is the correlation coefficient, $D_{det}$ is the deterministic-estimated duration for the RPD tuning segment, $D_{prob}$ is the probabilistic-estimated duration for the RPD tuning segment. For Equation 1 to work, when the correlation coefficient is determined to be less than 0, the value is set to 0.

In some examples, the RPD tuning information analyzer 214 selects either the probabilistic approach or the deterministic approach to estimate a capped duration for a reported RPD tuning segment based on the length of the reported RPD tuning segment. In some examples, this is accomplished by setting the correlation coefficient to either 0 or 1. In some examples, only the deterministic approach may be implemented when the reported RPD tuning segments are relatively long (e.g., over 180 minutes) while only the probabilistic approach may be implemented for relatively short segments (e.g., less than 180 minutes).

The example estimates for a capped duration of a reported RPD tuning information described above (including the probabilistic-estimated duration and the deterministic-estimated duration) correspond to front-end capped durations of RPD tuning segments. That is, the shortened or capped durations estimated above predict the actual duration of media played on a particular media set 116 beginning at the start time (i.e., the front-end) of the reported RPD tuning segment. However, as described above, in some examples, a single RPD tuning segment may correspond to multiple sessions of media played on the particular media set 116 that are separated by a gap in time corresponding to when an associated media set playing media was turned off. Thus, in addition to estimating a front-end capped duration for a reported RPD tuning session, the RPD tuning information analyzer 214 may also calculated a tail-end capped duration for the reported RPD tuning segment. A tail-end capped duration for a reported RPD tuning segment may be calculated in much the same way as described above for the front-end capped durations except that different probability distributions are used. More particularly, for tail-end capped durations, the graph 800 is used rather than the graph 700. That is, a probabilistic approach may be implemented by determining the tail-end capped duration based on where a randomly generated number falls on the tail-end panel segment distribution 802 of FIG. 8. Additionally or alternatively, a deterministic approach may be implemented by identifying a point on the distribution 804 (representative of 1 minus the modelled tuning segment distribution) to determine the duration associated with a corresponding point on the tail-end panel segment distribution 802. Further still, in some examples, the two approaches may be weight averaged based on a correlation coefficient calculated between the tail-end panel tuning segments and the associated modelled tuning segments.

In the illustrated example of FIG. 2, the audience measurement module 122 is provided with the example set-on time calculator 216 to calculate the particular times when a media set 116 is powered on based on the estimated front-end and tail-end capped durations for reported RPD tuning segments collected from an RPD device 112 associated with the media set 116. The example audience measurement module 122 is provided with the example report generator 218 to generate reports indicative of audience measurement metrics based on the RPD tuning information collected from non-panelist households 108 and the calculated set-on times of the media sets 116 in the non-panelist households 108. For example, the report generator 218 may generate a report crediting the non-panelist household 108 with exposure to the media accessed by the associated the RPD device 112 during the period(s) of time when the corresponding media set 116 is estimated to be powered on based on RPD tuning information collected from the RPD device 112.

While an example manner of implementing the audience measurement module 122 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example panel tuning information database 204, the example RPD tuning information database 206, the example RPD model generator 208, the example distribution generator 210, the example correlation calculator 212, the example RPD tuning information analyzer 214, the example set-on time calculator 216, the example report generator 218, and/or, more generally, the example audience measurement module 122 of FIG. 2 may be implemented by hardware, software, firmware and/or any combination of hardware, software and/or firmware. Thus, for example, any of the example communications interface 202, the example panel tuning information database 204, the example RPD tuning information database 206, the example RPD model generator 208, the example distribution generator 210, the example correlation calculator 212, the example RPD tuning information analyzer 214, the example set-on time calculator 216, the example report generator 218, and/or, more generally, the example audience measurement module 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example panel tuning information database 204, the example RPD tuning information database 206, the example RPD model generator 208, the example distribution generator 210, the example correlation calculator 212, the example RPD tuning information analyzer 214, the example set-on time calculator 216, and/or the example report generator 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement module 122 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the audience measurement module 122 of FIGS. 1 and/or 2 is shown in FIGS. 9-15. In this example, the machine readable instructions comprise a program for execution by a processor such as the processor 1612 shown in the example processor platform 1600 discussed below in connection with FIG. 16. The program may be embodied in software stored on a non-transitory computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 9-15, many other methods of implementing the example audience measurement module 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9-15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 9:
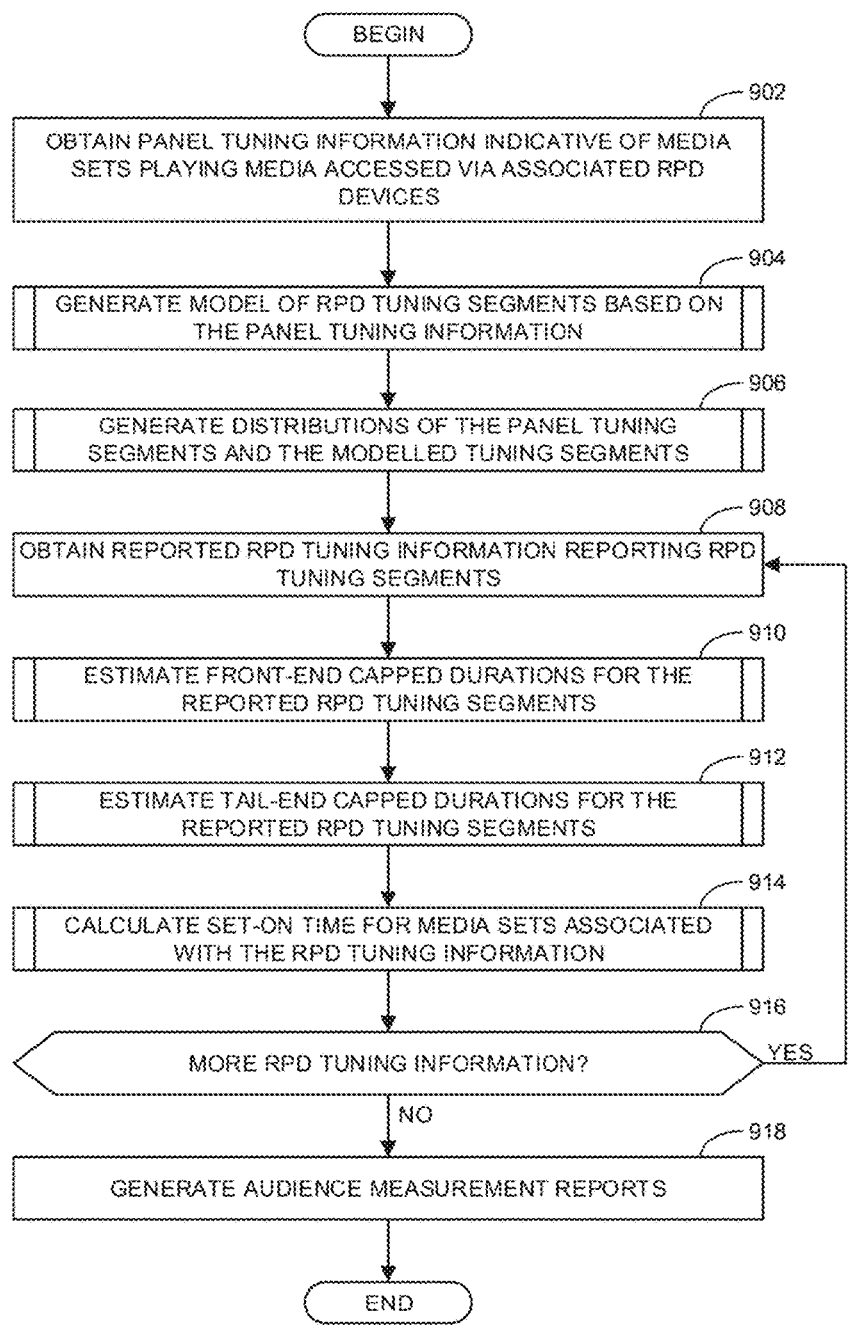
FIGS. 9-15 are flowcharts representative of example machine readable instructions that may be executed by one or more processors to implement the example audience measurement module of FIGS. 1 and/or 2.

Turning in detail to the flowcharts, the example process of FIG. 9 begins at block 902 where the example communications interface 202 obtains panel tuning information indicative of media sets (e.g., the media set 118) playing media accessed via associated RPD devices (e.g., the RPD device 114). In some examples, the panel tuning information is obtained from metering devices 120 in panelist households 110. The panel tuning information may be stored in the panel tuning information database 204.

At block 904, the example RPD model generator 208 generates a model of RPD tuning segments based on the panel tuning information. Further detail regarding the implementation of block 904 is provided below in connection with FIGS. 10 and 11. At block 906, the example distribution generator 208 generates distributions of the panel tuning segments and the modelled tuning segments. Further detail regarding the implementation of block 906 is provided below in connection with FIG. 12.

At block 908, the example communications interface 202 obtains reported RPD tuning information reporting RPD tuning segments. In some examples, the RPD tuning information is received from a content provider 102 that collected the data from RPD devices 112, 114. The RPD tuning information may be associated with panelist households 110 and/or non-panelist households 108. In some examples, the RPD devices 112, 114 may report the RPD tuning information directly to the communications interface 202.

At block 910, the example RPD tuning information analyzer 214 estimates front-end capped durations for the reported RPD tuning segments. Further detail regarding the implementation of block 910 is provided below in connection with FIG. 13. At block 912, the example RPD tuning information analyzer 214 estimates tail-end capped durations for the reported RPD tuning segments. Further detail regarding the implementation of block 912 is provided below in connection with FIG. 14.

At block 914, the example set-on time calculator 216 calculates a set-on times for the media sets associated with the RPD tuning information. Further detail regarding the implementation of block 914 is provided below in connection with FIG. 15. At block 916, the example communications interface 202 determines whether there is more audience RPD tuning information. If so, control returns to block 908. Otherwise, control advances to block 918 where the example report generator 218 generates audience measurement reports. Thereafter, the example process of FIG. 9 ends.

Figure 10:
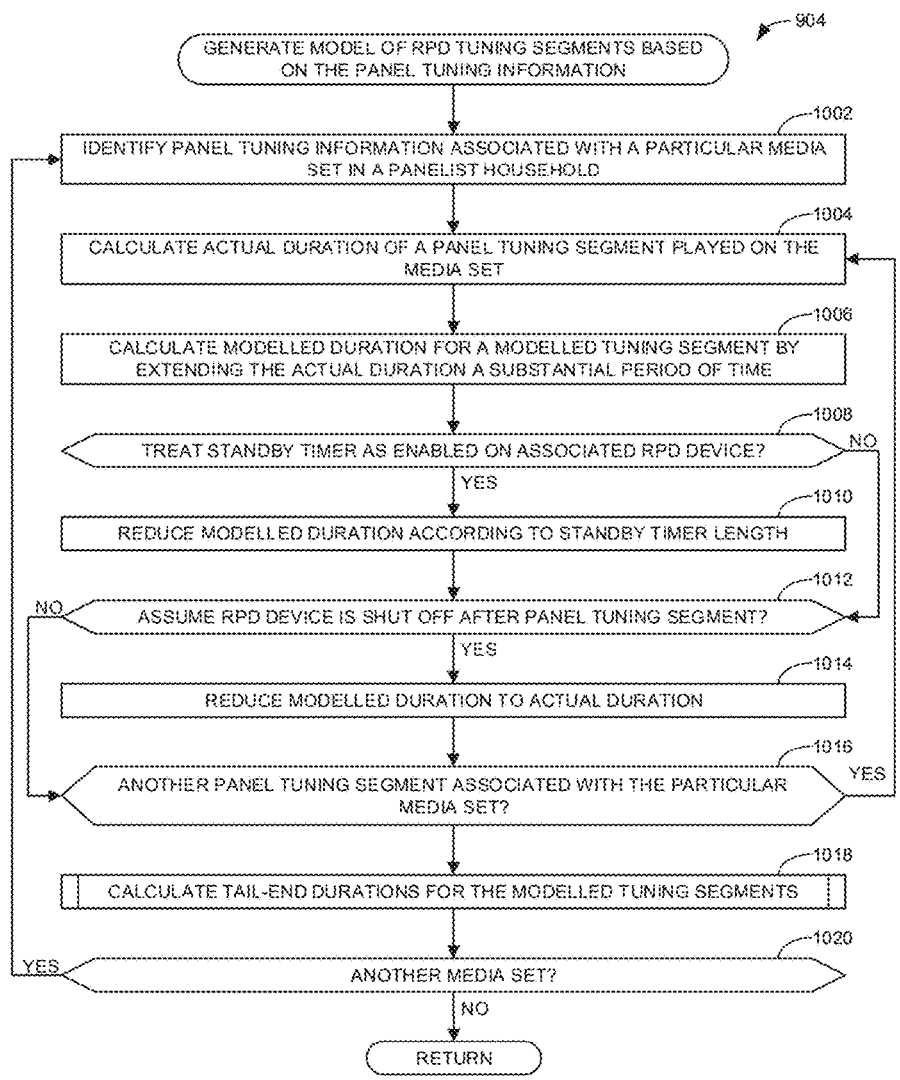

FIG. 10 illustrates an example process to implement block 904 of FIG. 9. The example process begins at block 1002 where the example RPD model generator 208 identifies panel tuning information associated with a particular media set 118 in a panelist household 110. At block 1004, the example RPD model generator 208 calculates the actual duration of a panel tuning segment played on the media set 118. While the media being played may be accessed via an associated RPD device 114, the actual duration of the media being played is independently determined based on feedback from the metering device 120 monitoring when the media set 118 is powered on and what media is being played.

At block 1006, the example RPD model generator 208 calculates a modelled duration for a modelled tuning segment by extending the actual duration a substantial extension period. In some examples, the substantial extension period is a period of time that extends forward indefinitely until a subsequent panel tuning segment occurs. In other examples, the substantial extension period is any suitable period of time that is significantly longer than a typical duration for a person to consume media (e.g., 12 hours, 24 hours, 48 hours, etc.).

At block 1008, the example RPD model generator 208 determines whether to treat a standby timer as enabled on the associated RPD device 118. As described above, standby timers are typically enabled by default but some users may manual disable the timers. In some examples, whether the RPD model generator 208 treats the standby timer as enabled is based on whether a randomly generated number between 0 and 1 falls above or below a percentage probability that users of the particular type of RPD device 118 disable the standby timer. If the example RPD model generator 208 determines to treat the standby timer as enabled, control advances to block 1010 where the example RPD model generator 208 reduces the modelled duration according to a standby timer length. That is, rather than extend the actual duration of the panel tuning segment a substantial extension period (e.g., an indefinite period of time), the modelled duration is limited to the length of the standby timer. Thereafter, control advances to block 1012. If the example RPD model generator 208 determines to not treat the standby timer as enabled (block 1008), control advances directly to block 1012.

At block 1012, the example RPD model generator 208 determines whether to assume the RPD device 118 is shut off after the panel tuning segment. In some examples, whether the RPD model generator 208 assumes the RPD device is shut off is based on whether a randomly generated number between 0 and 1 falls above or below a percentage probability that users of the particular type of RPD device 118 shut off the RPD device 118 when they turn off their associated media sets. If the example RPD model generator 208 determines to assume the RPD device 118 is shut off, control advances to block 1014 where the example RPD model generator 208 reduces the modelled duration to the actual duration. That is, the duration of the modelled tuning segment is assumed to be the same as the actual duration of the corresponding panel tuning segment. In other words, the modelled tuning segment is designated as a non-extended model segment. After reducing the RPD duration (block 1014), control advances to block 1016. If the example RPD model generator 208 determines not to assume the RPD device 118 is shut off, control advances directly to block 1016.

At block 1016, the example RPD model generator 208 determines whether there is another panel tuning segment associated with the particular media set. In some examples, the number of panel tuning segments associated with a particular set depends upon the period of time being analyzed to generate the model. In some examples, the RPD model generator 208 generates new models each day so that the models correspond to current data. In some such examples, the models generated for a particular day are based on RPD tuning information spanning multiple days surrounding the particular day of interest. For example, the RPD model generator 208 may analyze panel tuning segments reported during a four-week period (28) ending on the day of interest. In some examples, the period of time over which the panel tuning segments are analyzed may include data collected one or more days following the particular day of interest. In any event, if the example RPD model generator 208 determines there is another panel tuning segment associated with the particular media set to be analyzed, control returns to block 1004. Otherwise, control advances to block 1018 where the example RPD model generator 208 calculates tail-end durations for the modelled tuning segments. Further detail regarding the implementation of block 1018 is provided below in connection with FIG. 11. After calculating the tail-end durations (block 1018), control advances to block 1020 where the example RPD model generator 208 determines whether there is another media set. If so, control returns to block 1002. Otherwise, the example process of FIG. 10 ends and returns to complete the process of FIG. 9.

Figure 11:
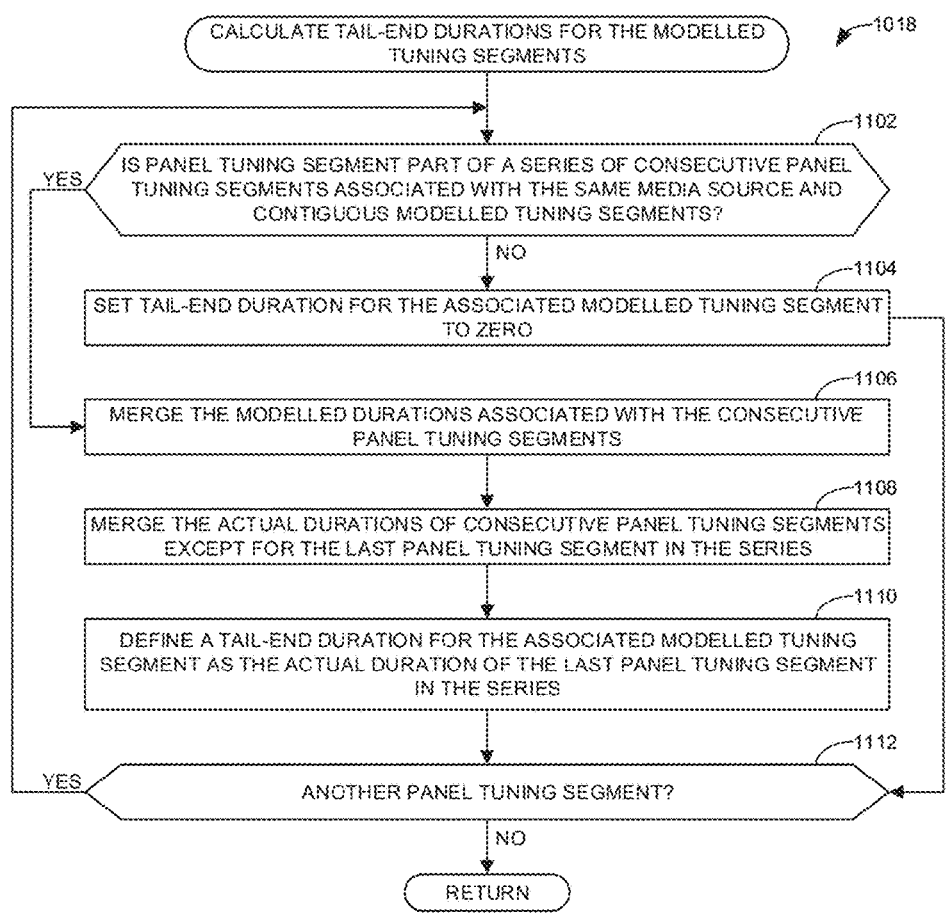

FIG. 11 illustrates an example process to implement block 1018 of FIG. 10. The example process begins at block 1102 where the example RPD model generator 208 determines whether a panel tuning segment is part of a series of consecutive panel tuning segments associated with the same media source and contiguous modelled tuning segments. If the example RPD model generator 208 determines that a panel tuning segment is not part of a series of consecutive panel tuning segments, control advances to block 1104. At block 1104, the example RPD model generator 208 sets the tail-end duration for the associated modelled tuning segment to zero. Thereafter, control advances to block 1112 where the example RPD model generator 208 determines whether there is another panel tuning segment to analyze.

Returning to block 1102, if the example RPD model generator 208 determines that a panel tuning segment is part of a series of consecutive panel tuning segments, control advances to block 1106. At block 1106, the example RPD model generator 208 merges the modelled durations associated with the consecutive panel tuning segments. In other words, the adjacent modelled tuning segments are combined and treated as a single RPD tuning segment. At block 1108, the example RPD model generator 208 merges the actual durations of the consecutive panel tuning segments except for the last panel tuning segment in the series. That is, the duration of the consecutive panel tuning segments are combined and treated as a single panel tuning segment. However, the merging of the panel tuning segments does not include the last panel tuning segment in the series. Thus, if the series includes only two consecutive segments, the merged actual duration would correspond to the actual duration of the first panel tuning segment. At block 1110, the example RPD model generator 208 defines the tail-end duration for the associated modelled tuning segment as the actual duration of the last panel tuning segment in the series.

At block 1112, the example RPD model generator 208 determines whether there is another panel tuning segment. If so, control returns to block 1102. Otherwise, the example process of FIG. 11 ends and returns to complete the process of FIG. 10.

Figure 12:
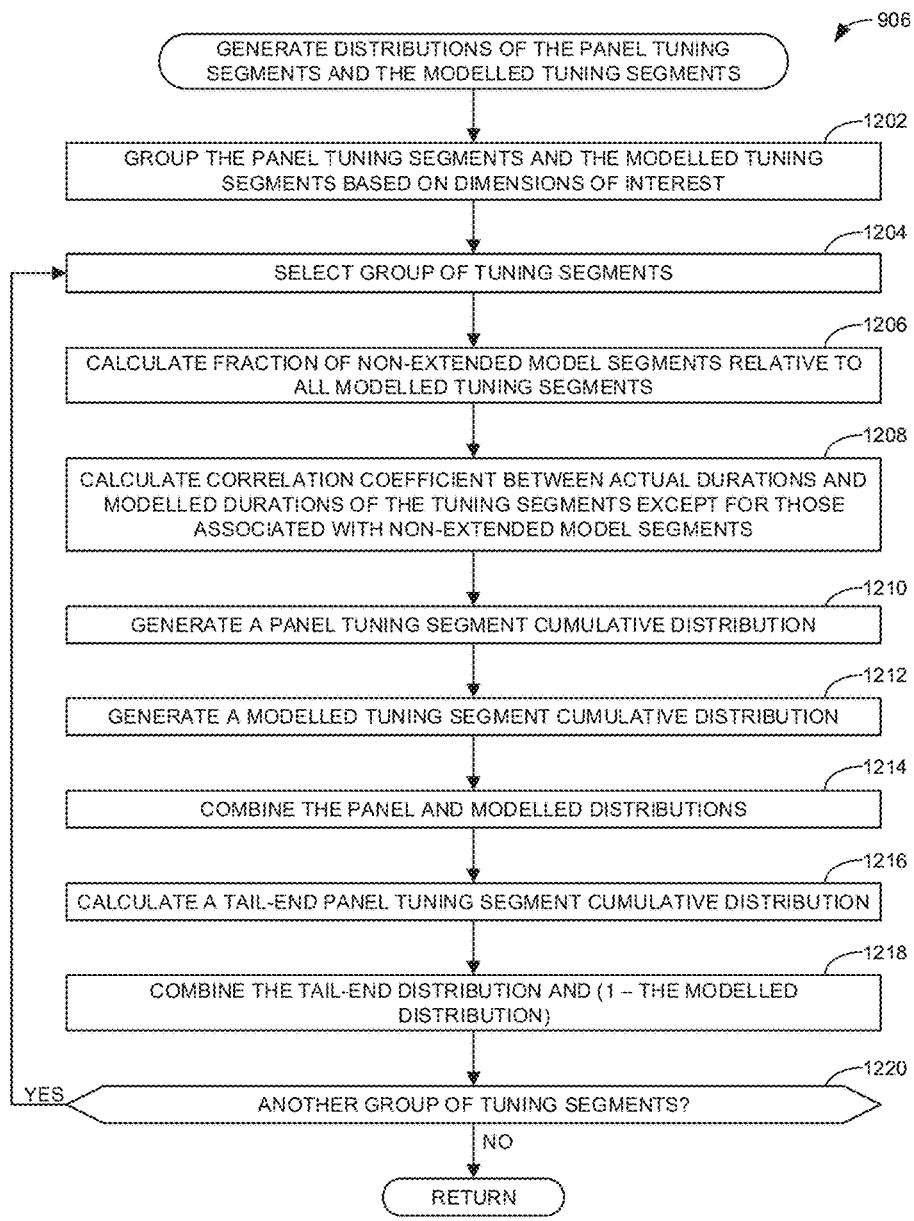

FIG. 12 illustrates an example process to implement block 906 of FIG. 9. The example process begins at block 1202 where the example distribution generator 210 groups the panel tuning segments and the modelled tuning segments based on dimensions of interest. The dimensions of interest may include daypart, day of week, station, genre, and/or tuning segment length.

At block 1204, the example distribution generator 210 selects a group of the tuning segments. At block 1206, the example distribution generator 210 calculates the fraction of non-extended model segments relative to all modelled tuning segments. That is, as described above, some modelled tuning segments will have a modelled duration that is the same as the associated panel tuning segment from which each tuning segment is modelled. The proportion of these non-extended model segments relative to the total number of modelled tuning segments is determined as the fraction at block 1206. At block 1208, the example distribution generator 210 calculates a correlation coefficient between the actual durations and the modelled durations of the tuning segments except for those associated with non-extended model segments. In some examples, the distribution generator 210 may set the correlation coefficient to either 0 or 1 (e.g., based on the duration of the tuning segments being analyzed).

At block 1210, the example distribution generator 210 generates a panel tuning segment distribution (e.g., the distribution 702 of FIG. 7). At block 1212, the example distribution generator 210 generates a modelled tuning segment distribution (e.g., the distribution 704 of FIG. 7). At block 1214, the example distribution generator 210 combines the panel and modelled distributions. At block 1216, the example distribution generator 210 calculates a tail-end panel tuning segment cumulative distribution (e.g., the distribution 802 of FIG. 8). At block 1218, the example distribution generator 210 combines the tail-end distribution and 1 minus the modelled distribution (e.g., the solid line 804 of FIG. 8).

At block 1220, the example distribution generator 210 determines whether there is another group of tuning segments. If so, control returns to block 1204. Otherwise, the example process of FIG. 12 ends and returns to complete the process of FIG. 9.

Figure 13:
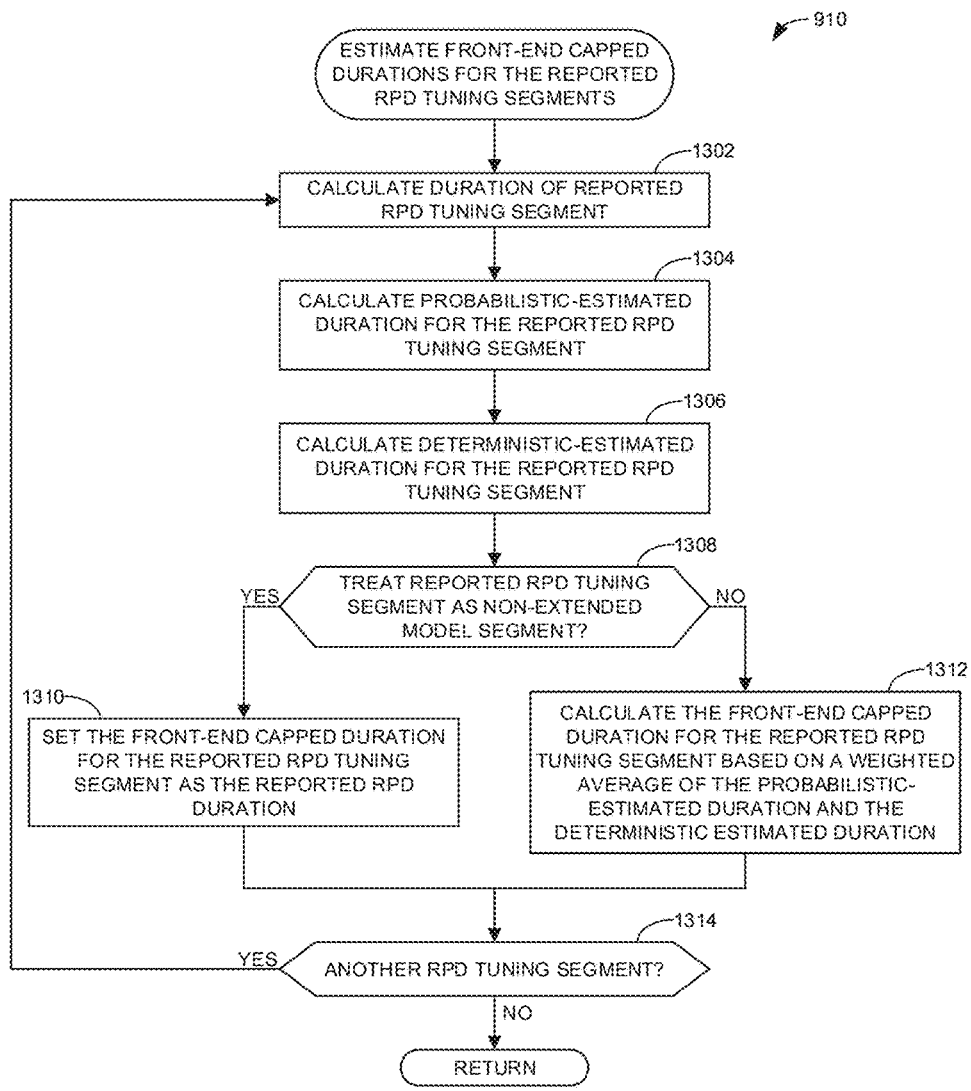

FIG. 13 illustrates an example process to implement block 910 of FIG. 9. The example process begins at block 1302 where the example RPD tuning information analyzer 214 calculates a duration of a reported RPD tuning segment. Typically, RPD tuning information includes start times and end times for different tuning segments. Accordingly, the example RPD tuning information analyzer 214 calculates the duration by subtracting the start time from the end time of the particular RPD tuning segment being analyzed.

At block 1304, the example RPD tuning information analyzer 214 calculates a probabilistic-estimated duration for the reported RPD tuning segment. This is accomplished by randomly generating a number and determining the corresponding duration on a panel tuning segment distribution associated with panel tuning segments sharing the same dimensions as the reported RPD tuning segment. At block 1306, the example RPD tuning information analyzer 214 calculates a deterministic-estimated duration for the reported RPD tuning segment. This is accomplished by determining the probability percentage on a modelled tuning segment distribution corresponding to the duration of the reported RPD tuning segment and then determining the corresponding duration on an associated panel tuning segment distribution.

At block 1308, the example RPD tuning information analyzer 214 determines whether to treat the reported RPD tuning segment as a non-extended model segment. In some examples, the RPD tuning information analyzer 214 accomplishes this by comparing a randomly generated number to the fraction of non-extended model segments relative to all modelled tuning segments calculated at block 1206 of FIG. 12. If the example RPD tuning information analyzer 214 determines to treat the reported RPD tuning segment as a non-extended model segment, control advances to block 1310 where the example RPD tuning information analyzer 214 sets the front-end capped duration for the RPD tuning segment as the reported RPD duration. Thereafter, control advances to block 1314 where the example RPD tuning information analyzer 214 determines whether there is another RPD tuning segment. If the example RPD tuning information analyzer 214 determines to not treat the reported RPD tuning segment as a non-extended model segment (block 1308), control advances to block 1312.

At block 1312, the example RPD tuning information analyzer 214 calculates the front-end capped duration for the reported RPD tuning segment based on a weighted average of the probabilistic-estimated duration and the deterministic estimated duration. This is accomplished using the correlation coefficient calculated at block 1208 of FIG. 12. In some examples, the correlation coefficient is set to either 0 or 1 such that the front-end capped duration is based exclusively on one of the probabilistic or deterministic approaches. In some examples, the process of FIG. 13 may be simplified by only calculating the front-end capped duration for the reported RPD tuning segment based on one of the probabilistic or deterministic approaches while the other approach and the weight averaging blocks are omitted.

After calculating the front-end capped duration at block 1312, control advances to block 1314. If the example RPD tuning information analyzer 214 determines there is another RPD tuning segment, control returns to block 1302. Otherwise, the example process of FIG. 13 ends and returns to complete the process of FIG. 9.

Figure 14:
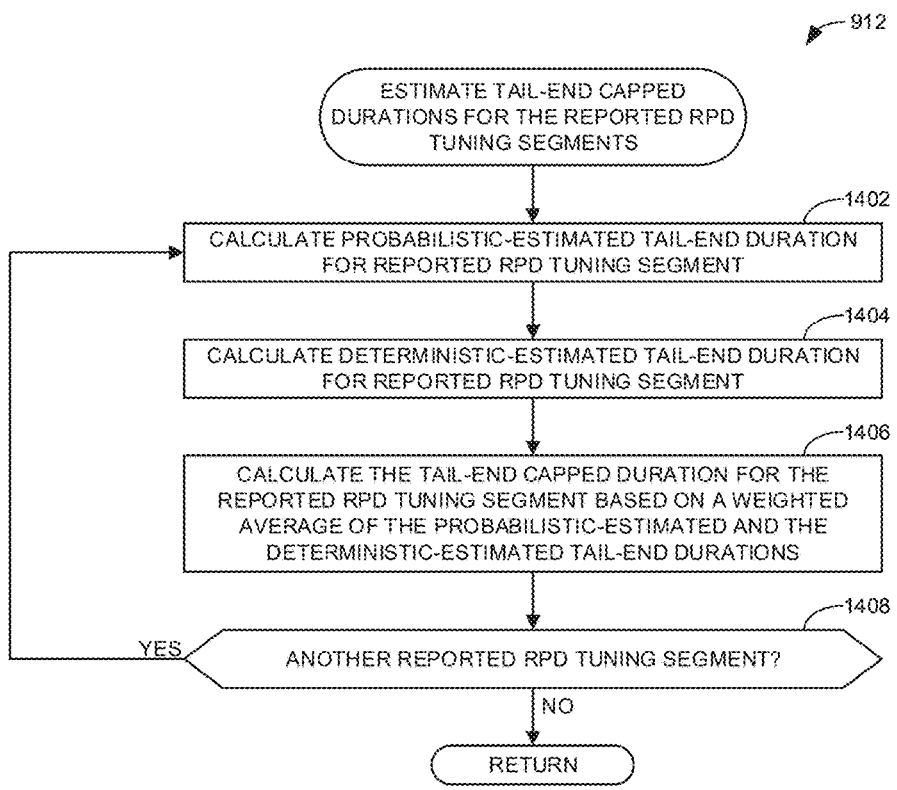

FIG. 14 illustrates an example process to implement block 912 of FIG. 9. The example process begins at block 1402 where the example RPD tuning information analyzer 214 calculates a probabilistic-estimated tail-end duration for the reported RPD tuning segment. At block 1404, the example RPD tuning information analyzer 214 calculates a deterministic-estimated tail-end duration for the reported RPD tuning segment. At block 1406, the example RPD tuning information analyzer 214 calculates the tail-end capped duration for the reported RPD tuning segment based on a weighted average of the probabilistic-estimated and the deterministic-estimated tail-end durations. In some examples, the correlation coefficient is set to either 0 or 1 such that the tail-end capped duration is based exclusively on one of the probabilistic or deterministic approaches. In some examples, the process of FIG. 14 may be simplified by only calculating the tail-end capped duration for the reported RPD tuning segment based on one of the probabilistic or deterministic approaches while the other approach and the weight averaging blocks are omitted.

After calculating the tail-end capped duration at block 1406, control advances to block 1408 where the example RPD tuning information analyzer 214 determines whether there is another reported RPD tuning segment. If so, control returns to block 1402. Otherwise, the example process of FIG. 14 ends and returns to complete the process of FIG. 9.

Figure 15:
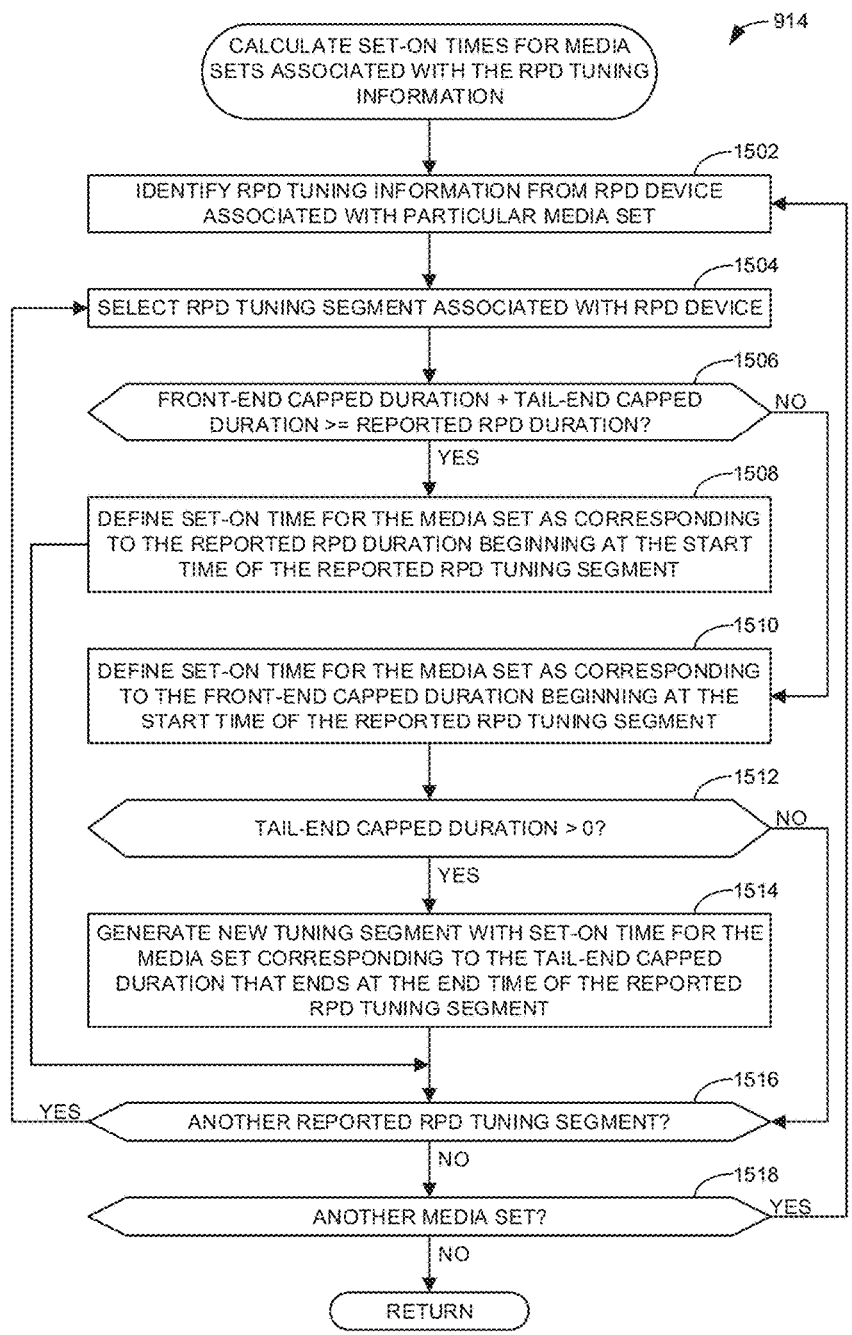

FIG. 15 illustrates an example process to implement block 914 of FIG. 9. The example process begins at block 1502 where the example set-on time calculator 216 identifies RPD tuning information from an RPD device associated with a particular media set. At block 1504, the example set-on time calculator 216 selects an RPD tuning segment associated with the RPD device. At block 1506, the example set-on time calculator 216 determines whether the sum of the front-end capped duration and the tail-end capped duration is greater than or equal to the reported RPD duration. If so, control advances to block 1508 where the example set-on time calculator 216 defines a set-on time for the media set as corresponding to the reported RPD duration beginning at the start time of the reported RPD tuning segment. Thereafter, control advances to block 1516 where the example set-on time calculator 216 determines whether there is another reported RPD tuning segment. If the example set-on time calculator 216 determines the sum of the front-end capped duration and the tail-end capped duration is less than the reported RPD duration, control advances to block 1510.

At block 1510, the example set-on time calculator 216 defines a set-on time for the media set as corresponding to the front-end capped duration beginning at the start time of the reported RPD tuning segment. At block 1512, the example set-on time calculator 216 determines whether the tail-end capped duration is greater than 0. If so, control advances to block 1514 where the example set-on time calculator 216 generates a new tuning segment with a set-on time for the media set corresponding to the tail-end capped duration that ends at the end time of the reported RPD tuning segment. Thereafter, control advances to block 1516. If the example set-on time calculator 216 determines that the tail-end capped duration is not greater than 0 (block 1512), control advances directly to block 1516.

At block 1516, the example set-on time calculator 216 determines whether there is another reported RPD tuning segment. If so, control returns to block 1504. Otherwise, control advances to block 1518 where the example set-on time calculator 216 determines whether there is another media set. If so, control returns to block 1502. Otherwise, the example process of FIG. 15 ends and control returns to complete the process of FIG. 9.

Figure 16:
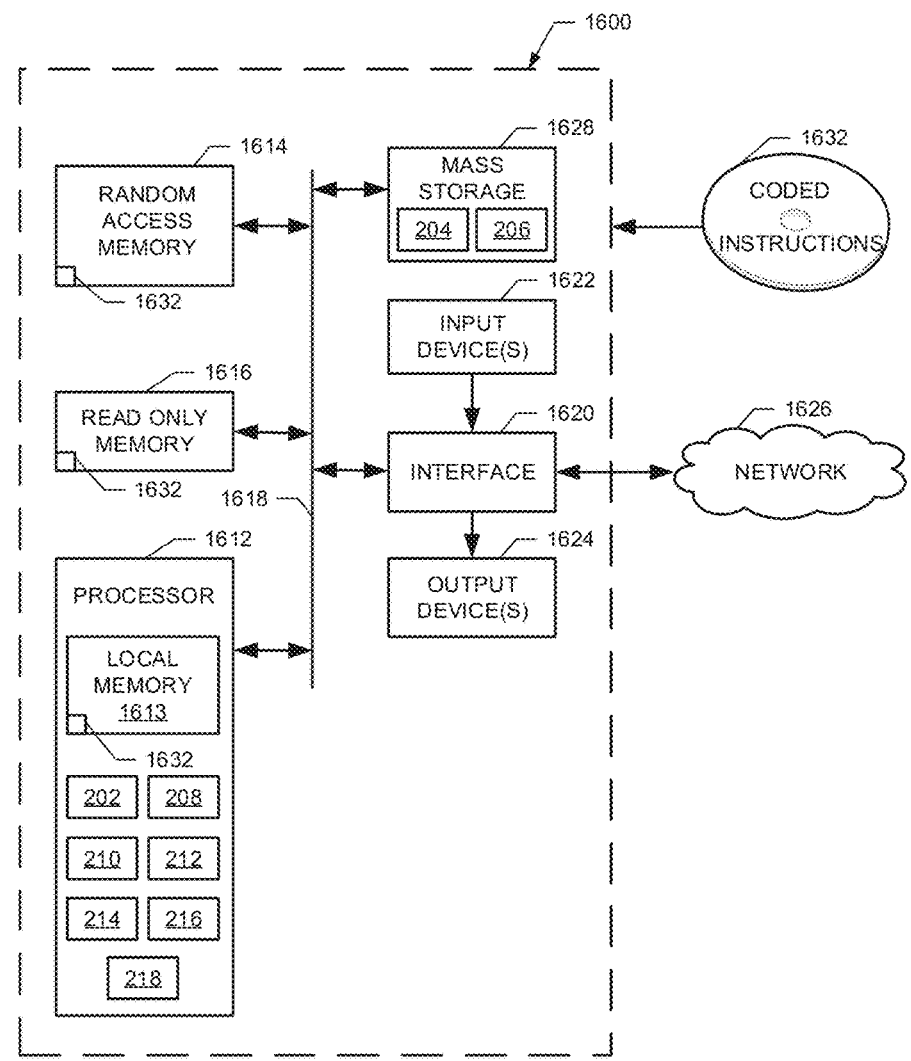
FIG. 16 is a schematic illustration of an example processing system that may be used and/or programmed to execute the example machine-readable instructions of FIGS. 9-15 to implement the example audience measurement module of FIGS. 1 and/or 2.

FIG. 16 is a block diagram of an example processor platform 1600 capable of executing the instructions of FIGS. 9-15 to implement the audience measurement module 122 of FIGS. 1 and/or 2. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. The hardware processor may be a semiconductor based (e.g., silicon based) device. In this example, the processor implements the example communications interface 202, the example RPD model generator 208, the example distribution generator 210, the example correlation calculator 212, the example RPD tuning information analyzer 214, the example set-on time calculator 216, and the example report generator 218.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. In the illustrated example, the mass storage devices 1628 implements the example panel tuning information database 204 and the example RPD tuning information database 206. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 9-15 may be stored in the mass storage device 1628, in the volatile memory 1614, in the non-volatile memory 1616, and/or on a removable tangible computer readable storage medium such as a CD or DVD.

From the foregoing, it will be appreciated that example methods, apparatus and articles of manufacture have been disclosed that improve the accuracy of estimating the on-off state of media sets based on RPD tuning information reported from RPD devices associated the media sets. This is important for accurate audience measurement metrics because people should not be counted as audience members exposed to media accessed by RPD devices unless the associated media set is powered on and actually playing the media being accessed and reported on in the collected RPD tuning information. In this manner, more accurate audience measurement metrics may be generated based on collected RPD tuning information.

Example 1 is an apparatus that includes a distribution generator, implemented via a processor, to generate a modelled tuning segment distribution indicative of modelled durations of modelled tuning segments. The modelled tuning segments based on panel tuning segments during which panelists were exposed to first media. The apparatus includes a return path data (RPD) tuning information analyzer, implemented via the processor, to analyze RPD tuning information reported from an RPD device. The RPD tuning information is indicative of a reported RPD tuning segment during which the RPD device was accessing second media. The apparatus includes a set-on time calculator, implemented via the processor, to estimate a set-on time for a media set associated with the RPD device based on the RPD tuning information and the modelled tuning segment distribution. The set-on time is indicative of a period of time when the media set is powered on.

Example 2 includes the subject matter of Example 1, wherein the distribution generator is to generate a panel tuning segment distribution indicative of actual durations of the panel tuning segments. The RPD tuning information analyzer is to determine a probability percentage on the modelled tuning segment distribution corresponding to a reported duration of the reported RPD tuning segment and to determine a deterministic-estimated duration based on where the probability percentage falls on the panel tuning segment distribution. The set-on time is estimated based on the deterministic-estimated duration.

Example 3 includes the subject matter of Example 2, wherein the RPD tuning information analyzer is to determine a probabilistic-estimated duration based on where a randomly generated number falls on the panel tuning segment distribution. The set-on time calculator is to determine the set-on time based on a weighted average of the deterministic-estimated duration and the probabilistic-estimated duration.

Example 4 includes the subject matter of anyone of Examples 1-3 and further includes an RPD model generator to determine actual durations of the panel tuning segments, calculate modelled durations based on the actual durations of the panel tuning segments, and define the modelled tuning segments based on the modelled durations.

Example 5 includes the subject matter of Example 4, wherein the RPD model generator is to calculate the modelled durations by: extending the actual durations of the panel tuning segments by the shorter of (1) a substantial extension period and (2) a gap in time between ones of the panel tuning segments and a next subsequent panel tuning segment; reducing the modelled durations associated with a first portion of the panel tuning segments based on a standby timer length associated with the RPD device; and reducing the modelled durations associated with a second portion of the panel tuning segments to the actual durations of the corresponding panel tuning segments of the second portion.

Example 6 includes the subject matter of Example 5, wherein the RPD model generator is to identify the first portion of the panel tuning segments based on a comparison of a randomly generated number to a probability that RPD devices used to access the first media have enabled standby timers.

Example 7 includes the subject matter of anyone of Examples 5 or 6, wherein the RPD model generator is to identify the second portion of the panel tuning segments based on a comparison of a randomly generated number to a probability that RPD devices used to access the first media are powered off at a same time that associated media sets are powered off.

Example 8 includes the subject matter of anyone of Examples 4-7, wherein the RPD model generator is to identify different series of consecutive ones of the panel tuning segments associated with a same media source and associated with contiguous modelled tuning segments. The RPD model generator to generate a tail-end panel tuning segment distribution indicative of actual durations of the last panel tuning segments in the different series of consecutive panel tuning segments. The RPD tuning information analyzer to estimate a tail-end duration for the reported RPD tuning segment based on the tail-end panel tuning segment distribution.

Example 9 includes the subject matter of Example 8, wherein the RPD model generator is to merge the contiguous modelled tuning segments associated with the different series of consecutive panel tuning segments into different single modelled tuning segments. The set-on time calculator is to calculate a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

Example 10 is a method that involves generating a modelled tuning segment distribution indicative of modelled durations of modelled tuning segments. The modelled tuning segments are based on panel tuning segments during which panelists were exposed to first media. The method includes obtaining return path data (RPD) tuning information reported from an RPD device. The RPD tuning information indicative of a reported RPD tuning segment during which the RPD device was accessing second media. The method includes estimating a set-on time for a media set associated with the RPD device based on the RPD tuning information and the modelled tuning segment distribution. The set-on time indicative of a period of time when the media set is powered on.

Example 11 includes the subject matter of Example 10 and further includes generating a panel tuning segment distribution indicative of actual durations of the panel tuning segments, determining a probability percentage on the modelled tuning segment distribution corresponding to a reported duration of the reported RPD tuning segment, and determining a deterministic-estimated duration for the set-on time based on where the probability percentage falls on the panel tuning segment distribution.

Example 12 includes the subject matter of Example 11 and further includes determining a probabilistic-estimated duration for the set-on time based on where a randomly generated number falls on the panel tuning segment distribution, and determining the set-on time based on a weighted average of the deterministic-estimated duration and the probabilistic-estimated duration.

Example 13 includes the subject matter of 10, further including: determining actual durations of the panel tuning segments, calculating modelled durations based on the actual durations of the panel tuning segments, and defining the modelled tuning segments based on the modelled durations.

Example 14 includes the subject matter of 13, wherein the modelled durations are calculated by: extending the actual durations of the panel tuning segments by the shorter of (1) a substantial extension period and (2) a gap in time between ones of the panel tuning segments and a next subsequent panel tuning segment, reducing the modelled durations associated with a first portion of the panel tuning segments based on a standby timer length associated with the RPD device, and reducing the modelled durations associated with a second portion of the panel tuning segments to the actual durations of the corresponding panel tuning segments of the second portion.

Example 15 includes the subject matter of 14, further including identifying the first portion of the panel tuning segments based on a comparison of a randomly generated number to a probability that RPD devices used to access the first media have enabled standby timers.

Example 16 includes the subject matter of 14, further including identifying the second portion of the panel tuning segments based on a comparison of a randomly generated number to a probability that RPD devices used to access the first media are powered off at a same time that associated media sets are powered off.

Example 17 includes the subject matter of 13, further including identifying different series of consecutive ones of the panel tuning segments associated with a same media source and associated with contiguous modelled tuning segments, generating a tail-end panel tuning segment distribution indicative of actual durations of the last panel tuning segments in the different series of consecutive panel tuning segments, and estimating a tail-end duration for the reported RPD tuning segment based on the tail-end panel tuning segment distribution.

Example 18 includes the subject matter of 17, further including merging the contiguous modelled tuning segments associated with the different series of consecutive panel tuning segments into different single modelled tuning segments, and calculating a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

Example 19 is a non-transitory computer readable medium comprising instructions that, when executed, cause a machine to at least generate a modelled tuning segment distribution indicative of modelled durations of modelled tuning segments. The modelled tuning segments is based on panel tuning segments during which panelists were exposed to first media. The instructs cause the machine to obtain return path data (RPD) tuning information reported from an RPD device. The RPD tuning information indicative of a reported RPD tuning segment during which the RPD device was accessing second media. The instructions cause the machine to estimate a set-on time for a media set associated with the RPD device based on the RPD tuning information and the modelled tuning segment distribution. The set-on time is indicative of a period of time when the media set is powered on.

Example 20 includes the subject matter of 19, wherein the instructions further cause the machine to generate a panel tuning segment distribution indicative of actual durations of the panel tuning segments, determine a probability percentage on the modelled tuning segment distribution corresponding to a reported duration of the reported RPD tuning segment, and determine a deterministic-estimated duration for the set-on time based on where the probability percentage falls on the panel tuning segment distribution.

Example 21 includes the subject matter of 20, wherein the instructions further cause the machine to determine a probabilistic-estimated duration for the set-on time based on where a randomly generated number falls on the panel tuning segment distribution, and determine the set-on time based on a weighted average of the deterministic-estimated duration and the probabilistic-estimated duration.

Example 22 includes the subject matter of anyone of Examples 19-21, wherein the instructions further cause the machine to determine actual durations of the panel tuning segments, calculate modelled durations based on the actual durations of the panel tuning segments, and define the modelled tuning segments based on the modelled durations.

Example 23 includes the subject matter of Example 22, wherein the modelled durations are calculated by: extending the actual durations of the panel tuning segments by the shorter of (1) a substantial extension period and (2) a gap in time between ones of the panel tuning segments and a next subsequent panel tuning segment, reducing the modelled durations associated with a first portion of the panel tuning segments based on a standby timer length associated with the RPD device, and reducing the modelled durations associated with a second portion of the panel tuning segments to the actual durations of the corresponding panel tuning segments of the second portion.

Example 24 includes the subject matter of Example 23, wherein the instructions further cause the machine to identify the first portion of the panel tuning segments based on a comparison of a randomly generated number to a probability that RPD devices used to access the first media have enabled standby timers.

Example 25 includes the subject matter of anyone of Examples 23 or 24, wherein the instructions further cause the machine to identify the second portion of the panel tuning segments based on a comparison of a randomly generated number to a probability that RPD devices used to access the first media are powered off at a same time that associated media sets are powered off.

Example 26 includes the subject matter of anyone of Examples 22-25, wherein the instructions further cause the machine to: identify different series of consecutive ones of the panel tuning segments associated with a same media source and associated with contiguous modelled tuning segments, generate a tail-end panel tuning segment distribution indicative of actual durations of the last panel tuning segments in the different series of consecutive panel tuning segments, and estimate a tail-end duration for the reported RPD tuning segment based on the tail-end panel tuning segment distribution.

Example 27 includes the subject matter of Example 17, wherein the instructions further cause the machine to merge the contiguous modelled tuning segments associated with the different series of consecutive panel tuning segments into different single modelled tuning segments. The instructions further cause the machine to calculate a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a return path data (RPD) model generator, implemented via a processor, to:
   determine actual durations of panel tuning segments during which panelists were exposed to first media; and
   calculate modelled durations for modelled tuning segments by:
      extending ones of the actual durations of the panel tuning segments by the shorter of (1) a substantial extension period and (2) a gap in time between ones of the panel tuning segments and a next subsequent panel tuning segment; and
      reducing ones of the extended actual durations based on a standby timer length;
   a distribution generator, implemented via the processor, to generate a modelled tuning segment distribution indicative of the modelled durations of the modelled tuning segments;
   an RPD tuning information analyzer, implemented via the processor, to analyze RPD tuning information reported from an RPD device, the RPD tuning information indicative of a reported RPD tuning segment during which the RPD device was accessing second media, the standby timer length associated with the RPD device; and
   a set-on time calculator, implemented via the processor, to estimate a set-on time for a media set associated with the RPD device based on the RPD tuning information and the modelled tuning segment distribution, the set-on time indicative of a period of time when the media set is powered on.

2. The apparatus of claim 1, wherein the distribution generator is to generate a panel tuning segment distribution indicative of the actual durations of the panel tuning segments, the RPD tuning information analyzer to determine a probability percentage on the modelled tuning segment distribution corresponding to a reported duration of the reported RPD tuning segment and to determine a deterministic-estimated duration based on where the probability percentage falls on the panel tuning segment distribution, the set-on time estimated based on the deterministic-estimated duration.

3. The apparatus of claim 2, wherein the RPD tuning information analyzer is to determine a probabilistic-estimated duration based on where a randomly generated number falls on the panel tuning segment distribution, the set-on time calculator to determine the set-on time based on a weighted average of the deterministic-estimated duration and the probabilistic-estimated duration.

4. The apparatus of claim 1, wherein the ones of the extended actual durations reduced based on the standby timer length are associated with a first portion of the panel tuning segments, and the RPD model generator is to calculate the modelled durations by:
   reducing ones of the extended actual durations associated with a second portion of the panel tuning segments to the actual durations of the corresponding panel tuning segments of the second portion.

5. The apparatus of claim 4, wherein the RPD model generator is to identify the first portion of the panel tuning segments based on a comparison of a randomly generated number to a probability that RPD devices used to access the first media have enabled standby timers.

6. The apparatus of claim 4, wherein the RPD model generator is to identify the second portion of the panel tuning segments based on a comparison of a randomly generated number to a probability that RPD devices used to access the first media are powered off at a same time that associated media sets are powered off.

7. An apparatus, comprising:
a return path data (RPD) model generator, implemented via a processor, to:
  determine actual durations of panel tuning segments during which panelists were exposed to first media;
  calculate modelled durations based on the actual durations of the panel tuning segments;
  define modelled tuning segments based on the modelled durations; and
  identify different series of consecutive ones of the panel tuning segments associated with a same media source and associated with contiguous modelled tuning segments;
a distribution generator, implemented via the processor, to:
  generate a modelled tuning segment distribution indicative of the modelled durations of the modelled tuning segments; and
  generate a tail-end panel tuning segment distribution indicative of the actual durations of the last panel tuning segments in the different series of consecutive panel tuning segments;
an RPD tuning information analyzer, implemented via the processor, to:
  analyze RPD tuning information reported from an RPD device, the RPD tuning information indicative of a reported RPD tuning segment during which the RPD device was accessing second media; and
  estimate a tail-end duration for the reported RPD tuning segment based on the tail-end panel tuning segment distribution; and
a set-on time calculator, implemented via the processor, to estimate a set-on time for a media set associated with the RPD device based on the RPD tuning information and the modelled tuning segment distribution, the set-on time indicative of a period of time when the media set is powered on.

8. The apparatus of claim 7, wherein the RPD model generator is to merge the contiguous modelled tuning segments associated with the different series of consecutive panel tuning segments into different single modelled tuning segments, the set-on time calculator to calculate a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

9. A method comprising:
determining actual durations of panel tuning segments during which panelists were exposed to first media;
calculating modelled durations for modelled tuning segments by:
  extending ones of the actual durations of the panel tuning segments by the shorter of (1) a substantial extension period and (2) a gap in time between ones of the panel tuning segments and a next subsequent panel tuning segment; and
  reducing ones of the extended actual durations based on a standby timer length;
generating a modelled tuning segment distribution indicative of the modelled durations of the modelled tuning segments;
obtaining return path data (RPD) tuning information reported from an RPD device, the RPD tuning information indicative of a reported RPD tuning segment during which the RPD device was accessing second media, the standby timer length associated with the RPD device; and
estimating a set-on time for a media set associated with the RPD device based on the RPD tuning information and the modelled tuning segment distribution, the set-on time indicative of a period of time when the media set is powered on.

10. The method of claim 9, further including:
generating a panel tuning segment distribution indicative of the actual durations of the panel tuning segments;
determining a probability percentage on the modelled tuning segment distribution corresponding to a reported duration of the reported RPD tuning segment; and
determining a deterministic-estimated duration for the set-on time based on where the probability percentage falls on the panel tuning segment distribution.

11. The method of claim 10, further including:
determining a probabilistic-estimated duration for the set-on time based on where a randomly generated number falls on the panel tuning segment distribution; and
determining the set-on time based on a weighted average of the deterministic-estimated duration and the probabilistic-estimated duration.

12. The method of claim 9, wherein the ones of the extended actual durations reduced based on the standby timer length are associated with a first portion of the panel tuning segments, and the modelled durations are calculated by:
reducing ones of the extended actual durations associated with a second portion of the panel tuning segments to the actual durations of the corresponding panel tuning segments of the second portion.

13. The method of claim 12, further including identifying the first portion of the panel tuning segments based on a comparison of a randomly generated number to a probability that RPD devices used to access the first media have enabled standby timers.

14. The method of claim 12, further including identifying the second portion of the panel tuning segments based on a comparison of a randomly generated number to a probability that RPD devices used to access the first media are powered off at a same time that associated media sets are powered off.

15. A method comprising:
determining actual durations of panel tuning segments during which panelists were exposed to first media;
calculating modelled durations based on the actual durations of the panel tuning segments;
defining modelled tuning segments based on the modelled durations;
generating a modelled tuning segment distribution indicative of the modelled durations of the modelled tuning segments;
obtaining return path data (RPD) tuning information reported from an RPD device, the RPD tuning information indicative of a reported RPD tuning segment during which the RPD device was accessing second media;
estimating a set-on time for a media set associated with the RPD device based on the RPD tuning information and the modelled tuning segment distribution, the set-on time indicative of a period of time when the media set is powered on;

identifying different series of consecutive ones of the panel tuning segments associated with a same media source and associated with contiguous modelled tuning segments;

generating a tail-end panel tuning segment distribution indicative of actual durations of the last panel tuning segments in the different series of consecutive panel tuning segments; and estimating a tail-end duration for the reported RPD tuning segment based on the tail-end panel tuning segment distribution.

16. The method of claim 15, further including:

merging the contiguous modelled tuning segments associated with the different series of consecutive panel tuning segments into different single modelled tuning segments; and calculating a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

17. A non-transitory computer readable medium comprising instructions that, when executed, cause a machine to at least:

determine actual durations of panel tuning segments during which panelists were exposed to first media;

calculate modelled durations for modelled tuning segments by:
extending ones of the actual durations of the panel tuning segments by the shorter of (1) a substantial extension period and (2) a gap in time between ones of the panel tuning segments and a next subsequent panel tuning segment; and
reducing ones of the extended actual durations based on a standby timer length;

generate a modelled tuning segment distribution indicative of the modelled durations of the modelled tuning segments;

obtain return path data (RPD) tuning information reported from an RPD device, the RPD tuning information indicative of a reported RPD tuning segment during which the RPD device was accessing second media, the standby timer length associated with the RPD device; and estimate a set-on time for a media set associated with the RPD device based on the RPD tuning information and the modelled tuning segment distribution, the set-on time indicative of a period of time when the media set is powered on.

18. The non-transitory computer readable medium of claim 17, wherein the instructions further cause the machine to:

generate a panel tuning segment distribution indicative of actual durations of the panel tuning segments;

determine a probability percentage on the modelled tuning segment distribution corresponding to a reported duration of the reported RPD tuning segment; and determine a deterministic-estimated duration for the set-on time based on where the probability percentage falls on the panel tuning segment distribution.

19. The non-transitory computer readable medium of claim 18, wherein the instructions further cause the machine to:

determine a probabilistic-estimated duration for the set-on time based on where a randomly generated number falls on the panel tuning segment distribution; and determine the set-on time based on a weighted average of the deterministic-estimated duration and the probabilistic-estimated duration.

20. The non-transitory computer readable medium of claim 17, wherein the ones of the extended actual durations reduced based on the standby timer length are associated with a first portion of the panel tuning segments, the instructions to further cause the machine to calculate the modelled durations by reducing ones of the extended actual durations associated with a second portion of the panel tuning segments to the actual durations of the corresponding panel tuning segments of the second portion.

21. The non-transitory computer readable medium of claim 20, wherein the instructions further cause the machine to identify the first portion of the panel tuning segments based on a comparison of a randomly generated number to a probability that RPD devices used to access the first media have enabled standby timers.

22. The non-transitory computer readable medium of claim 20, wherein the instructions further cause the machine to identify the second portion of the panel tuning segments based on a comparison of a randomly generated number to a probability that RPD devices used to access the first media are powered off at a same time that associated media sets are powered off.

23. A non-transitory computer readable medium comprising instructions that, when executed, cause a machine to at least:

determine actual durations of panel tuning segments during which panelists were exposed to first media;

calculate modelled durations based on the actual durations of the panel tuning segments;

define modelled tuning segments based on the modelled durations;

generate a modelled tuning segment distribution indicative of the modelled durations of the modelled tuning segments;

obtain return path data (RPD) tuning information reported from an RPD device, the RPD tuning information indicative of a reported RPD tuning segment during which the RPD device was accessing second media;

estimate a set-on time for a media set associated with the RPD device based on the RPD tuning information and the modelled tuning segment distribution, the set-on time indicative of a period of time when the media set is powered on;

identify different series of consecutive ones of the panel tuning segments associated with a same media source and associated with contiguous modelled tuning segments;

generate a tail-end panel tuning segment distribution indicative of actual durations of the last panel tuning segments in the different series of consecutive panel tuning segments; and estimate a tail-end duration for the reported RPD tuning segment based on the tail-end panel tuning segment distribution.

24. The non-transitory computer readable medium of claim 23, wherein the instructions further cause the machine to:

merge the contiguous modelled tuning segments associated with the different series of consecutive panel tuning segments into different single modelled tuning segments; and calculate a second set-on time for the media set corresponding to the tail-end duration for the reported RPD tuning segment when a reported duration for the reported RPD tuning segment is greater than the sum of the tail-end duration for the reported RPD tuning segment and a front-end duration for the reported RPD tuning segment.

\* \* \* \* \*